(12) United States Patent
Boden

(10) Patent No.: US 10,857,460 B2
(45) Date of Patent: Dec. 8, 2020

(54) SOCIALLY-DRIVEN MODELING SYSTEMS AND METHODS

(71) Applicant: Kurt Boden, Chicago, IL (US)

(72) Inventor: Kurt Boden, Chicago, IL (US)

( * ) Notice: Subject to any disclaimer, the term of this patent is extended or adjusted under 35 U.S.C. 154(b) by 0 days.

(21) Appl. No.: 16/546,281

(22) Filed: Aug. 20, 2019

(65) Prior Publication Data

US 2020/0054946 A1 Feb. 20, 2020

Related U.S. Application Data

(60) Provisional application No. 62/720,114, filed on Aug. 20, 2018.

(51) Int. Cl.
*A63F 13/42* (2014.01)
*G06F 3/0482* (2013.01)
*G06N 20/00* (2019.01)
*G06F 3/0481* (2013.01)

(52) U.S. Cl.
CPC ............. *A63F 13/42* (2014.09); *G06N 20/00* (2019.01); *A63F 2300/308* (2013.01); *G06F 3/0482* (2013.01); *G06F 3/04815* (2013.01)

(58) Field of Classification Search
USPC .......................................................... 463/31
See application file for complete search history.

(56) References Cited

U.S. PATENT DOCUMENTS 9,545,579 B2* 1/2017 Hishinuma ............. A63F 13/56
2017/0124901 A1* 5/2017 Sasidhar .................. G09B 5/06

* cited by examiner

*Primary Examiner* — Pierre E Elisca
(74) *Attorney, Agent, or Firm* — K&L Gates LLP

(57) ABSTRACT

A socially-driven system includes a database including a dataset, a processor, a display controlled by the processor, and a memory coupled to the processor, wherein the memory is configured to store program instructions executable by the processor. In response to executing the program instructions, the processor is configured to receive a dataset, generate a game image that represents the data set, display the game image on a user device, and receive user input within the game image from the user device, wherein the user input has a value derived from the dataset, and wherein the user input comprises a user fit of the dataset.

18 Claims, 21 Drawing Sheets

Game Flow Overview

Straight Wall Example

Round Wall Example

Zombie Movement Example

Nuclear Option Example

SOCIALLY-DRIVEN MODELING SYSTEMS AND METHODS

CROSS-REFERENCE TO RELATED APPLICATIONS

This application incorporates by reference and claims the benefit of priority to U.S. Provisional Application No. 62/720,114 filed Aug. 20, 2018, which is incorporated herein by reference.

BACKGROUND OF THE INVENTION

The present subject matter relates generally to a crowd-sourced, data science, model fitting framework that leverage a natural human ability to accurately identify visual patterns in data in a video game platform.

A subfield of the more general discipline of statistics, data science uses scientific principles along with algorithmic, computer-aided approaches to find trends in data and make predictions about the future. Data science algorithms are the backbone of many major achievements in the last thirty years. From early warning cancer detection in the healthcare industry, to stock market investment models, to the pursuit of self-driving vehicles, it has developed into the most highly demanded skillset in the modern world.

The types of models developed in the field of data science can be broken down into three areas: regression models (modeling for a continuous variable), classification models (modeling for a binary or categorical variable), and clustering (identifying common characteristics in a dataset). Each of these model areas can be further subdivided based upon the specific statistical approaches of the given model. Examples of linear regression models, classification models, and clustering models are provided in FIGS. 1-3, respectively.

Within the area of regression modeling alone, one will find linear regression models, decision trees, K-nearest neighbors, generalized linear models, random forests, gradient boosted machines, and neural nets, to name a few. Each of these regression model types is unique in its approach to model generation. General linear regression modeling optimizes model performance by minimizing data distance from linear fit lines. Decision trees bucket data to minimize overall standard deviation. Neural nets randomly assemble and optimize a series of logic gates to isolate signals, in an attempt to simulate the inner workings of the human brain.

Further, developments in machine learning have provided improvements in modeling as well. For an example within the medical field, radiologists analyze images to detect cancerous growths. In studies performed in this area, human detection have a miss rate of about 3%, meaning that growths are misclassified 3% of the time, while artificial intelligence has a miss rate of about 7%. When humans leverage the output of artificial intelligence detection algorithms in combination with human detection (for example, detection includes one machine reading and one human reading of each image), the miss rate drops below 1%. This human-aided machine learning approach is hugely useful, and can be taken one step further. Rather than waiting for a model to be built, the humans can guide the machine learning algorithms step by step during the building process to produce better fits of the data and better models.

Accordingly, there is a need for a new approach to regression, classification, and clustering model building that directly takes advantage of the evolutionary skill of pattern recognition that is found in every human, as described herein.

BRIEF SUMMARY OF THE INVENTION

To meet the needs described above and others, the present disclosure provides socially-driven systems and methods utilizing a unique approach to data science model building through a socially-driven algorithm. All current data science algorithms rely on computer computation and statistical analysis to solve the complex prediction problem. The presently claimed socially-driven systems and methods leverage an innate human talent for pattern recognition to more efficiently solve the problem.

When presented with a plot of data, one's natural instinct is to identify a trend. Even if a person does not know what he is looking at, the human brain automatically fits the data to the best of its ability. This recognition process is the backbone of the socially-driven systems and methods described herein. The socially-driven system does not attempt to completely fit a model with the best fit of a single person; rather, the model is crowd-sourced for fit, and the best fit is produced by averaging the fits of all users. The prediction strength of the best individual fit is dwarfed by the average of several mediocre fits.

Referring to FIGS. 4 and 5, the best analogy to this fitting process is the case of drawing the perfect circle. If an individual is given a single chance to draw a perfect circle, the likelihood that they will accomplish this task is practically zero, as illustrated in FIG. 4. But, if the data set includes a number of individual attempts of a relatively small sample of people, a perfect circle can be created by radially average the attempts of the group, as shown in FIG. 5.

An additional aspect of the socially-driven system is the platform through which the users fit the models. By creating a portable device or web-based gaming platform that can either be installed on any smart electronic device or accessed through any device having internet access, the socially-driven system provides a scalable model building engine that provides entertainment to the user in exchange for their model fitting ability. Through the development of different game types and scenarios, the socially-driven system can be applied to all areas of data science: regression, classification, and clustering.

Further, the incorporation of machine learning into the socially-driven platform provides improved and more stable results than machine learned models alone.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
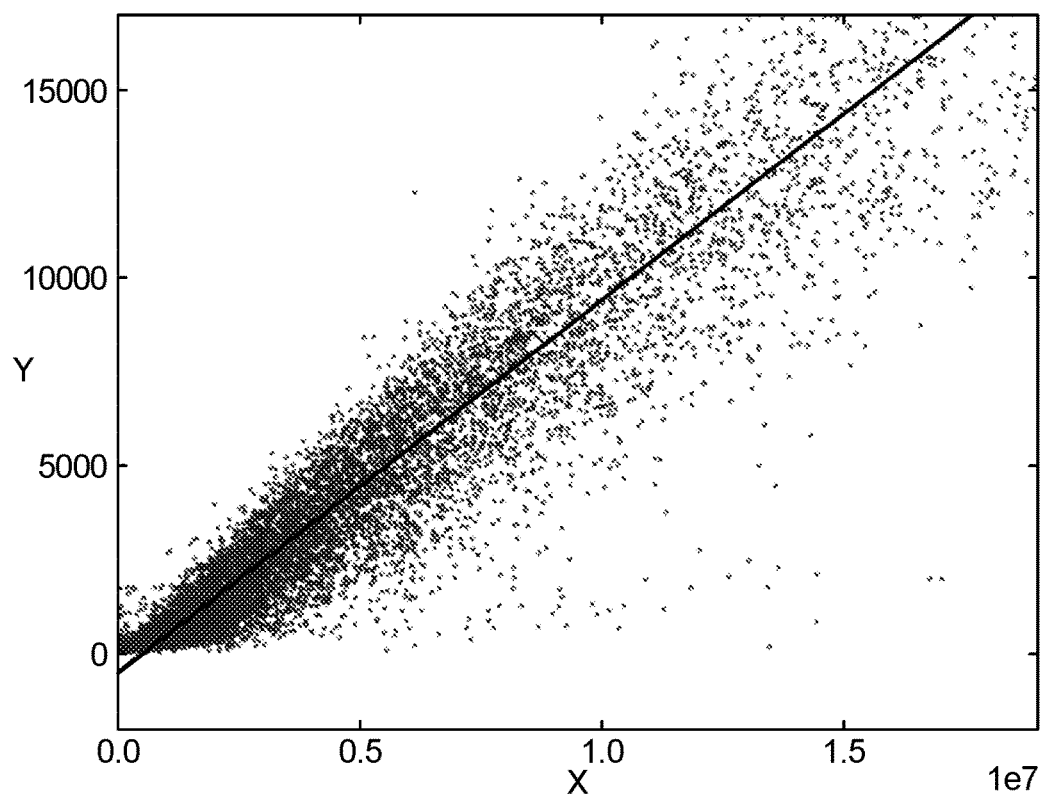
FIGS. 1-3 are images of regression models, classification models, and clustering models, respectively.
Figure 2:
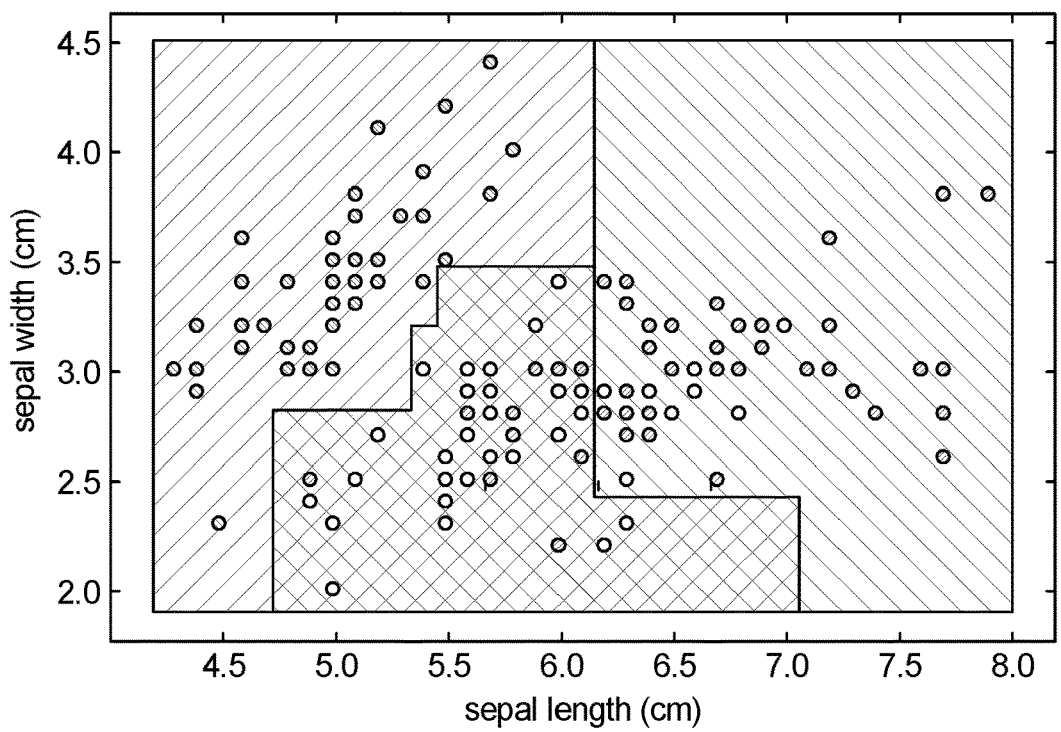
Figure 3:
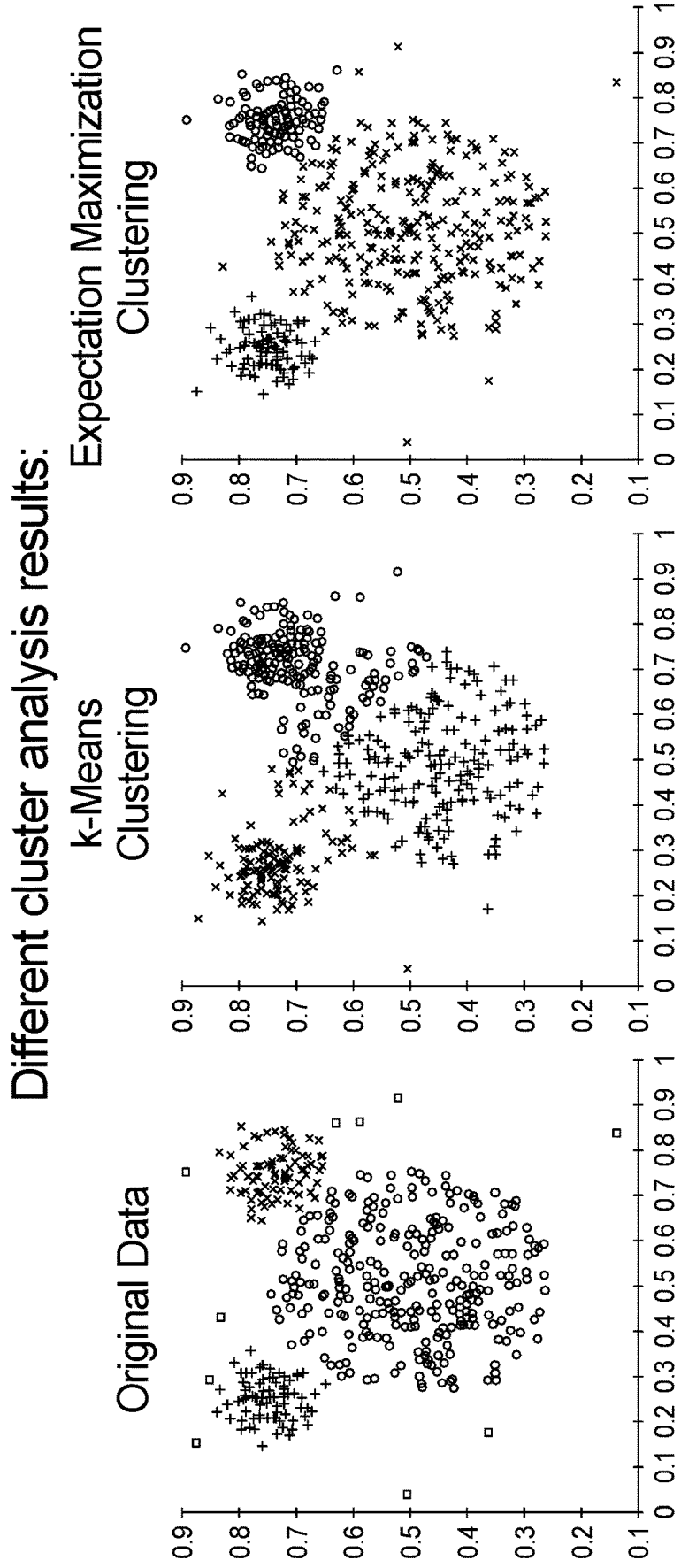
Figure 4:
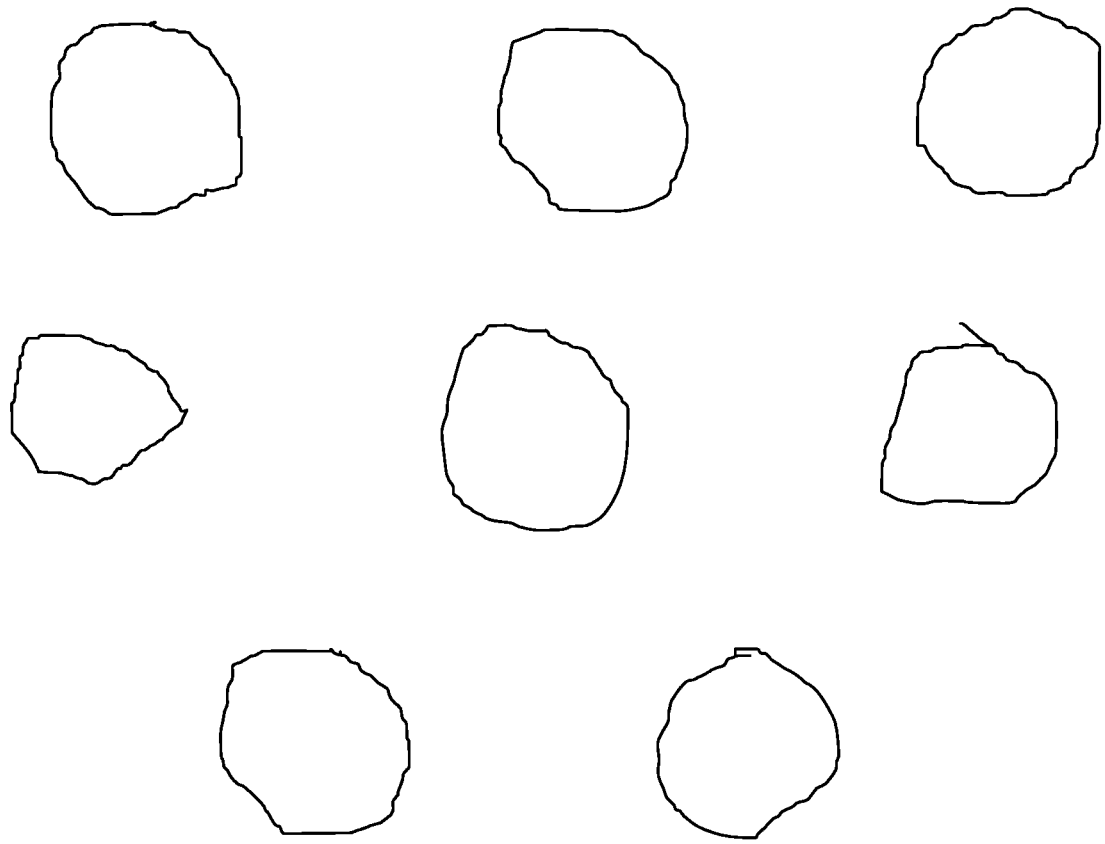
FIG. 4 illustrates individual hand-drawn circles.
Figure 5:
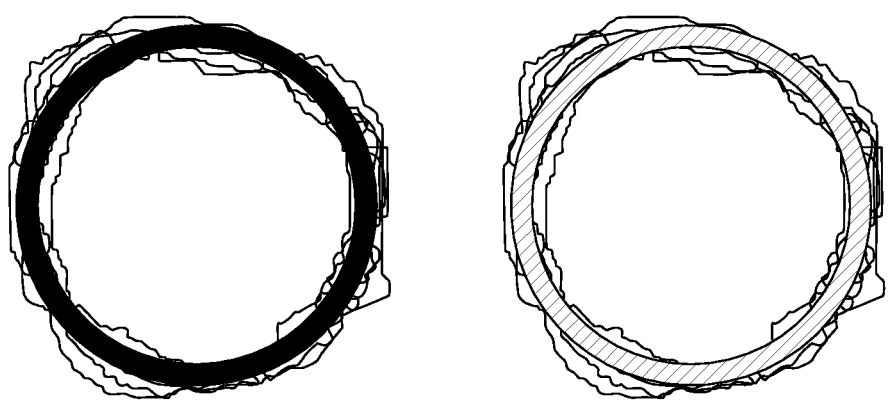
FIG. 5 illustrates the merger of individual circles and radial average.
Figure 6A:
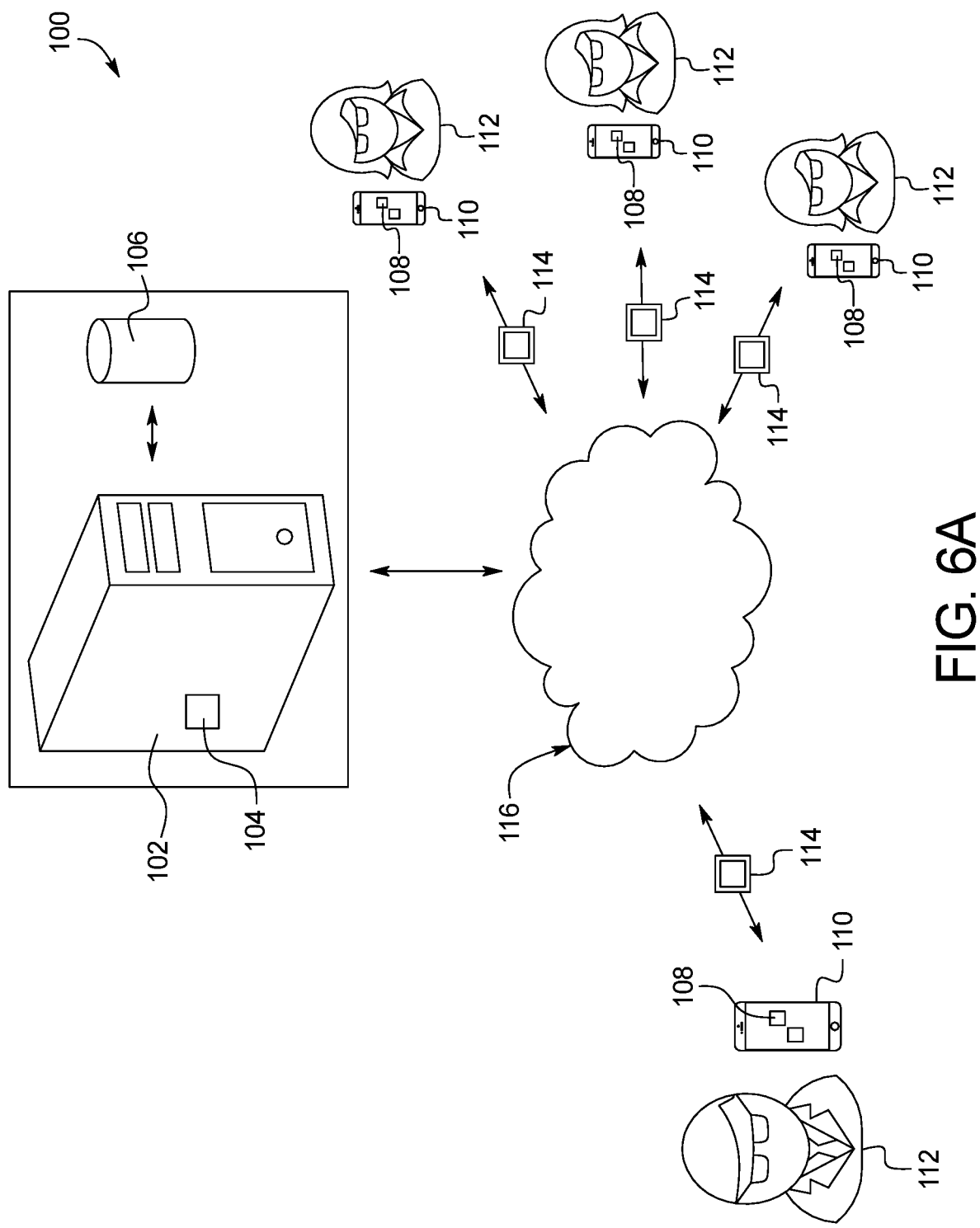
FIGS. 6A, 6B, and 6C are schematics of the socially-driven system and a flow chart illustrating the application of the socially-driven system of the present application.
Figure 6B:
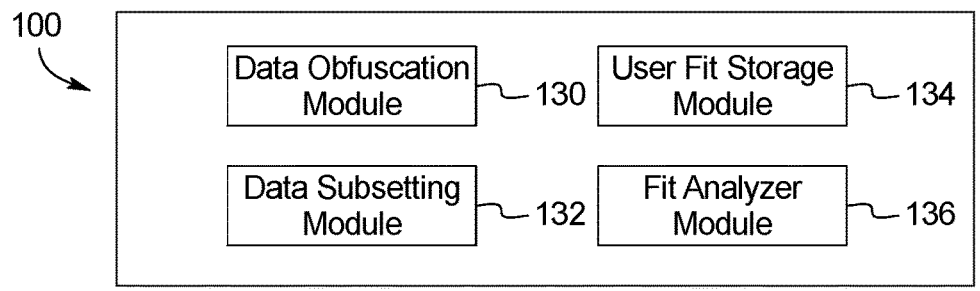

FIGS. 6A and 6B illustrate an example the socially-driven system 100 and corresponding method 150 described herein. The socially-driven system 100 includes a number of modules that work together to present data to a number of individual users through game images, allowing each user to provide a user fit for the data. The system 100 then averages user fits to determine the best fit for the data. By utilizing a socially-driven algorithm, the presently claimed socially-driven systems and methods leverage an innate human talent for pattern recognition to more efficiently solve the problem.

1. The Socially-Driven System and Method

FIG. 6A illustrates an example system 100 for processing data and using a game interface to collect user fits. The system 100 includes a processor 102 having a memory 104 configured to store program instructions executable by the processor 102, and is in communication with one or more databases 106 for storing raw data, anonymized data, and user fits. The system 100 may include software 108 such as a mobile application that is installed on devices 110 of users 112. The software 108 may also be a web-based platform that is accessed through a laptop, tablet, or other device operated by users 112. Data 106 such as data packets and user fits are communicated between the user devices 110 and the processor 112 over a network 116, such as the internet.

Referring to FIG. 6B, the system 100 may include a plurality of modules for performing steps of the method 150. A data obfuscation module 130 anonymizes raw data to ensure privacy of information. A data subsetting module 132 divides data into packets based on the variable to be fit and used by the game interface to collect a user fit for the specific variable. The socially-driven system 100 collects and stores user fits in a user fit storage module 134, and analyzes the collection of user fits in a fit analyzer module 136. In other embodiments, the system 100 may include additional or fewer modules to accomplish the steps of the method 150 outlined below.

Figure 6C:
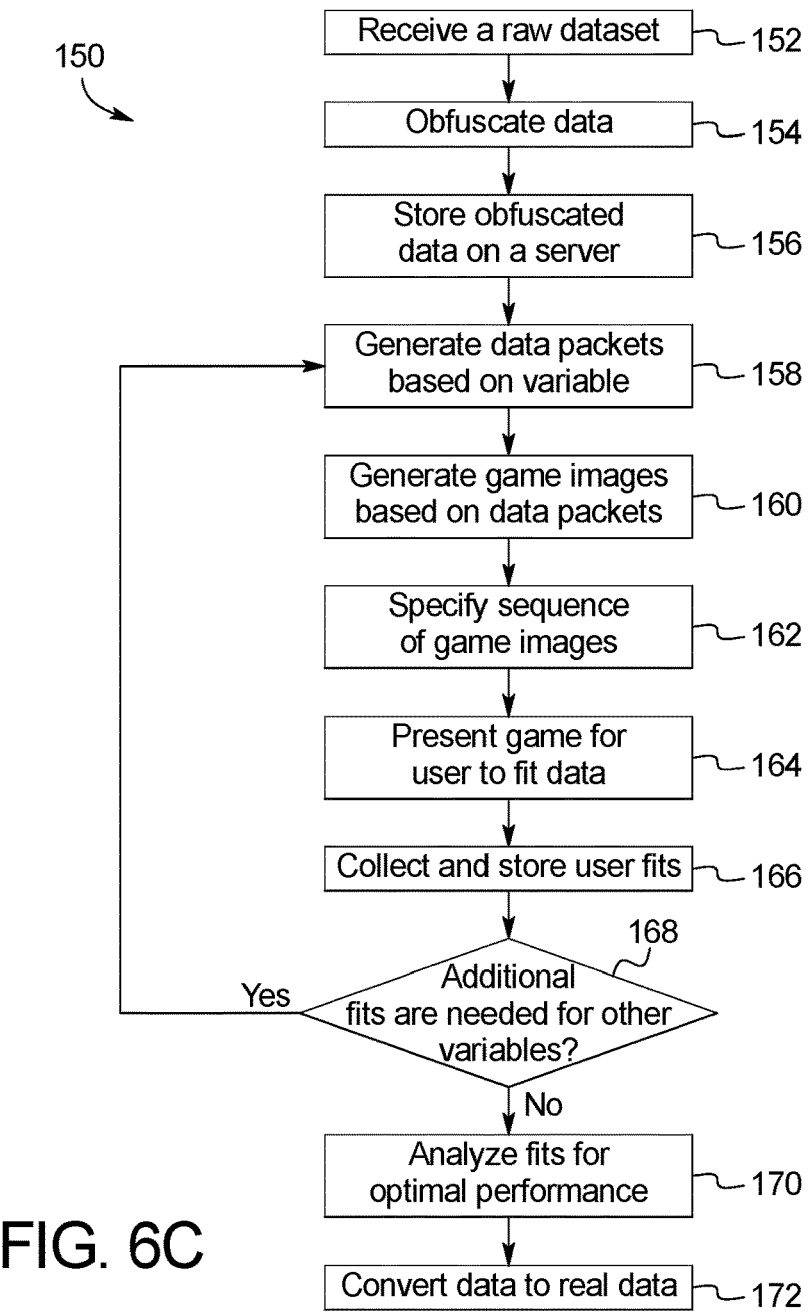

FIG. 6C illustrates a method of operating the system 100 of FIG. 6A. In step 152, a raw dataset having a very broad class of file is provided to the system. In one embodiment, a user first selects a model type and then selects a dependent variable intended to be predicted (if applicable). Because socially-driven systems are so versatile and work within the general gaming framework, the values of the data provided to the model are obfuscated to avoid disclosure of private information to the game players in step 154. Continuous data can be normalized/standardized, stretched, and/or shifted. The values of the categorical variables may be mapped to numbers or letters, or hashed by an obfuscation tool to assure anonymity.

In step 156, the obfuscated data is placed on the database 106 for access by server-side code and remains unseen by the game players. In a preferred embodiment, the obfuscated data on the database 106 is segmented by project, and the original predicted values each project are stored along with each iteration of the fitted values on the database.

The organized, obfuscated data is then divided into test and train datasets in step 158. The training dataset is provided to the game player, and the test dataset is used to evaluate the quality and/or generality of the fit (the bias/variance tradeoff). The data is then divided into packets since the amount of points shown to the user at any given time is limited. The test/train subset packets are used to generate game images.

In step 160, the socially-driven system 100 plots the data and converts the data into a game-ready image. The points are converted into game objects as described in the following game embodiments. The plot axes are removed and the game background is added to the image.

In step 162, the socially-driven system 100 stores the game images in an ordered format and tags the game images so they are ready for the user to call them into the game. In some embodiments, the game images are pre-created in order to generate a selection available for the user, which allows for fewer calculations and computations to be performed on the game device.

In step 164, the user calls an image into the game and fits the data to create a user fit. The term "fit" as used in this context is game-dependent and is described in greater detail below. When the user has finished creating the user fit, the fit data is sent back to the server where it will be processed further.

The system 100 stores the user fits in database 106 via the user fit storage module 134 in step 166. The socially-driven system 100 may compile user fits by project. The term "fit chain" refers to the functionality of the socially-driven system being dependent on the ordering and fitting of one dimension of data at a time. During one game, a user may fit a number of random model variables in sequence, modeling a single random model variable at a time. After each user fit is developed, the fit is stored in the database in step 166. The socially-driven system then determines whether additional fits are needed in step 168. If so, the system 100 returns to step 158 to generate new data packets based on a new variable in order to perform additional fits. In one embodiment, for example, after the user fit for variable $X_i$ is received, that data subset may be subtracted from the dataset of dependent variable Y and new game images for all other X variables may be generated. In some embodiments, the process may be repeated as many times as needed based on how well the averaged fit of all user fits performs on the test dataset. If additional fits are not needed and the data has been fully fit and processed, the system 100 moves onto step 170.

In step 170, the socially-driven system 100 averages and analyzes the user fits for optimal performance in the fit analyzer module 108. By analyzing the contents of the user fit storage module 134, the socially-driven system 100 can average fits, analyze performance, and optimize the quality of the model that is sent back to the client.

In the step 172, the socially-driven system 100 converts the best fit data into real data. The obfuscated model is converted to the original real values by reversing the obfuscation process, and the unobfuscated data is provided to the client.

2. Example Games

In step 160 of the method 150 described above, the socially-driven system 100 processes the data into game-ready images. The user then performs the "fits" through a game that approximates a regression, a classification, or a clustering model as described below.

2.1 Regression Modeling Games

FIGS. 7A-7D illustrate a game 700 that presents data in the form of trees 702 and truffles 704, referred to as the Truffle Shuffle. As a two-player game, the players are asked to navigate a pig through a landscape and collect truffles, which are most likely found near trees. The wind direction is shown in the upper right corner. Each player's pig must be downwind from the truffles to smell and/or collect them. Player one starts by drawing their path through the trees. The best path is determined by which player collects the most truffles to win the game. In one embodiment, the trees may be subset packets of points for a single variable, a y-value (dependent) that is dependent on an (independent) x-value, while the truffles may be a subset packet of the test data.

Figure 7A:
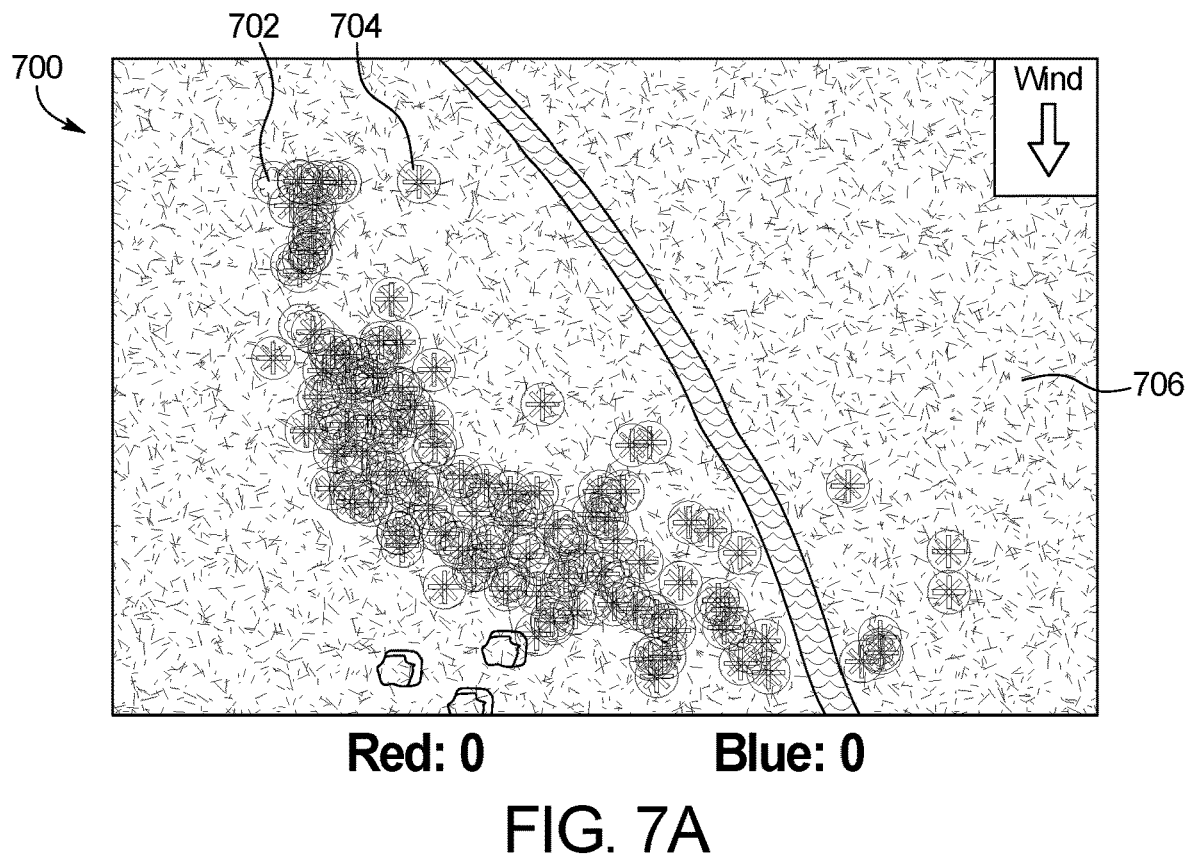
FIGS. 7A-7D are user interfaces of the game Truffle Shuffle.
Figure 7B:
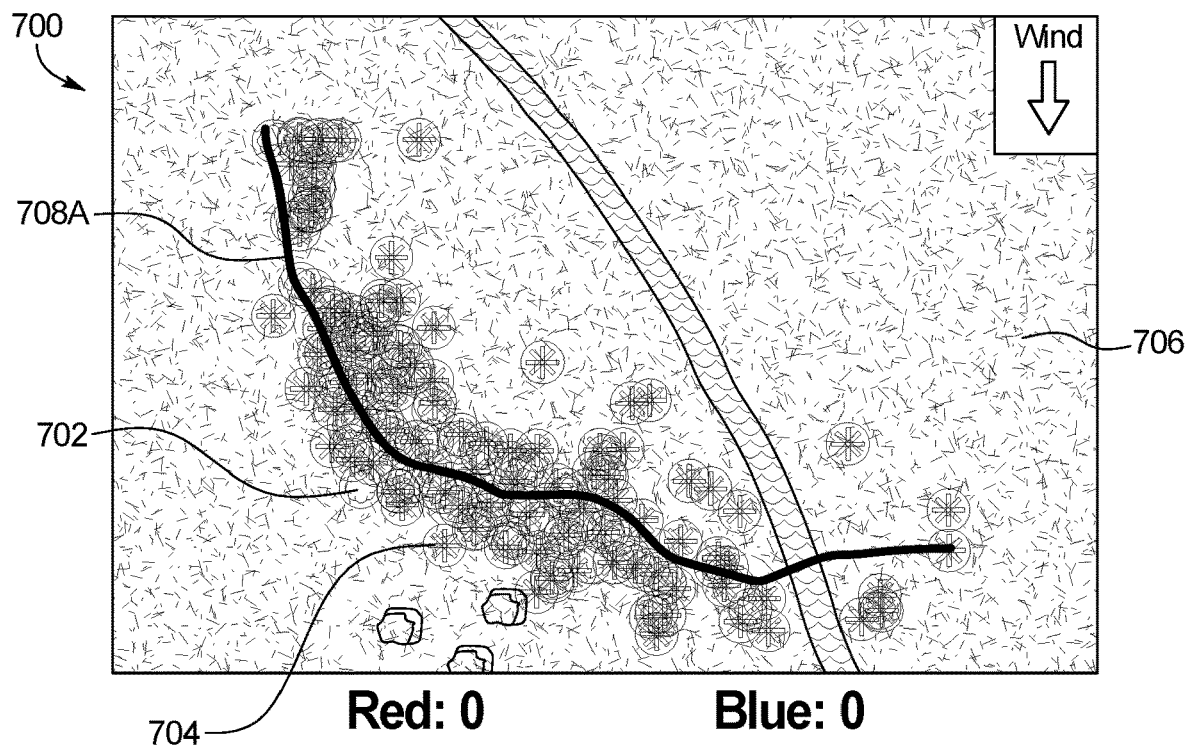
Figure 7C:
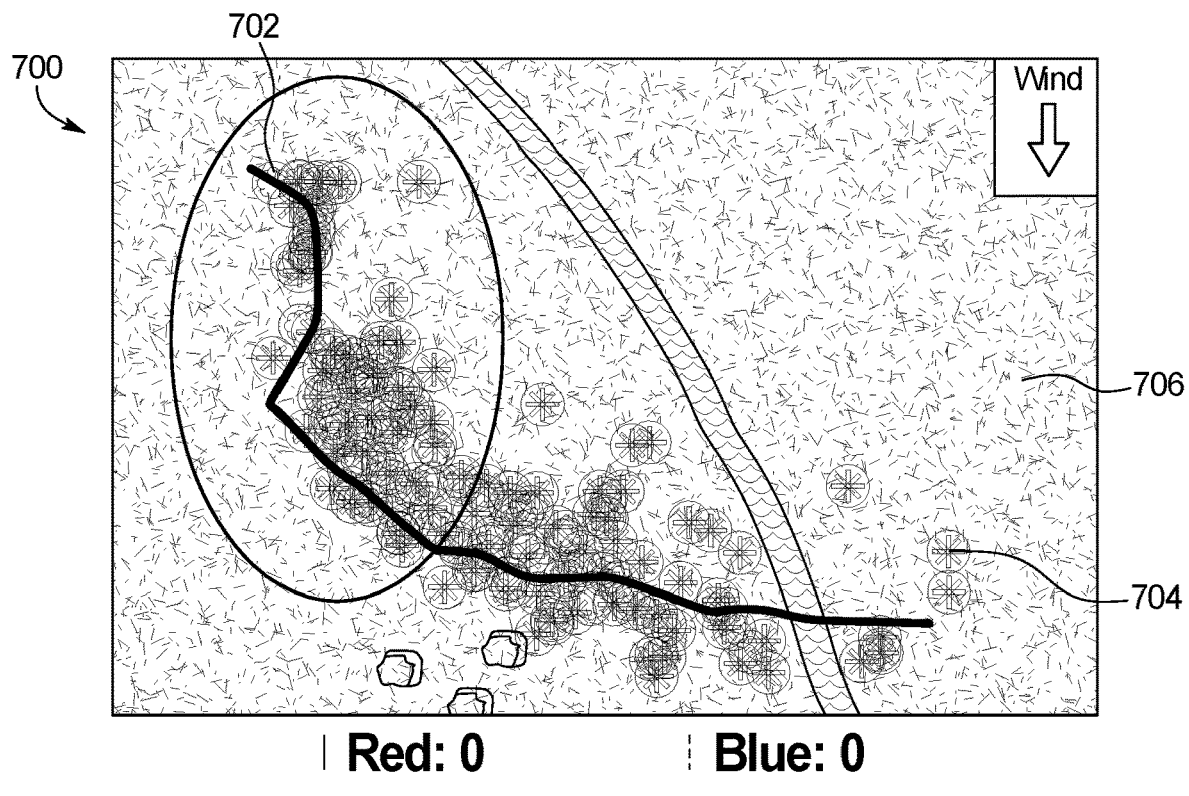

FIG. 7A illustrates an example screen showing the truffles 704 on a landscape 706. FIGS. 7B and 7C show paths 708A, 708B drawn by the red player. During use, a player is not allowed to backtrack in their path, so the circled portion of the path 708B of FIG. 7C would not be allowed. This restriction forces a functional form of the regression line. A function can only have a single value for each input "x" value. Or, the path drawn is injective. In other embodiments, this is a restriction that can be modified to allow square bucketing of data, similar to the square boundaries of decision trees or random forests.

Figure 7D:
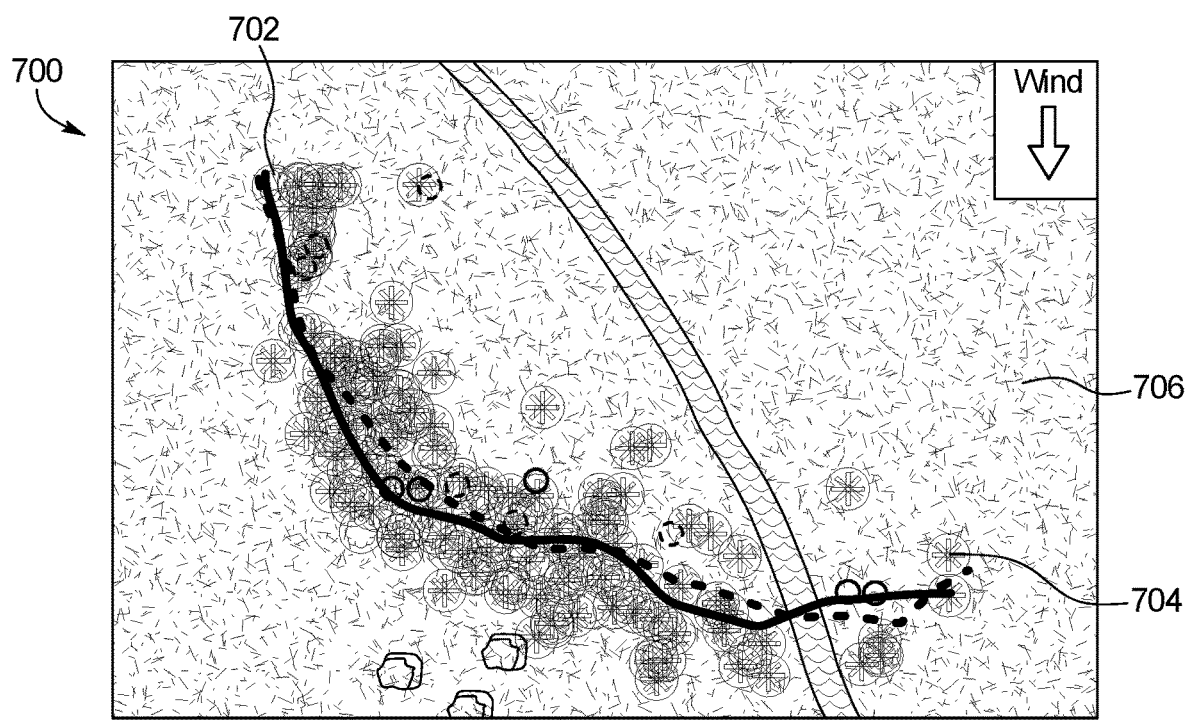

FIG. 7D is a comparison of the red and blue fit lines 708A, 710A and the truffle collection 712, 714 per player. The blue player won six truffles and the red player won five truffles. In one embodiment, there are a total of 11 truffles available each round, and the first player to collect 30 truffles wins.

In this embodiment, the training data are the trees 702 and the test data are the truffles 704. Not all of the training data and/or the test data must be shown to the user. The training/test data shown may be subset data packets of each variable, dependent on the game image limitations. Some games allow for the majority or all data to be shown to the users, while other game images allow for a more limited set of data to be shown. Each game has a threshold amount of data that the user is able to see at a given time. In the embodiment illustrated in FIG. 7D, only 11 points are selected at random to represent the truffles. After the users draw their user fits, their user fits are sent to the user fit storage module 134 to be analyzed and a new image is taken from the game images generated in step 164 of the method 150.

Another aspect of Truffle Shuffle that can be used in all modeling games of the socially-driven system 100 is outlier detection. Individuals may perform outlier detection poorly, either identifying too many points as outliers or too few. Taking into account a majority rules outlier selection basis, the socially-driven system 100 can identify suspected outliers quickly and accurately and flag these points in the dataset.

Finally, there are additional data views that can be leveraged during the game to increase the user's fit accuracy. First, the user may select an alpha value, or a transparency value ranging from 0 (transparent) to 1 (opaque), for the trees. Second, the socially-driven system 100 allows the user to rotate the image and show a topographical map of the forests. Taller trees will be found in more dense areas, which will avoid the need to select a perfect alpha value for the plots. Finally, the plotting of the trees (or coins, weeds, space ships, etc.) can provide variation in color, shape, alpha value, and border color to add multiple variable dimensions to a single plot. This will not only allow for more unique fitting approaches, it will also add a degree of difficulty that will make the game more engaging for the users.

Figure 8A:
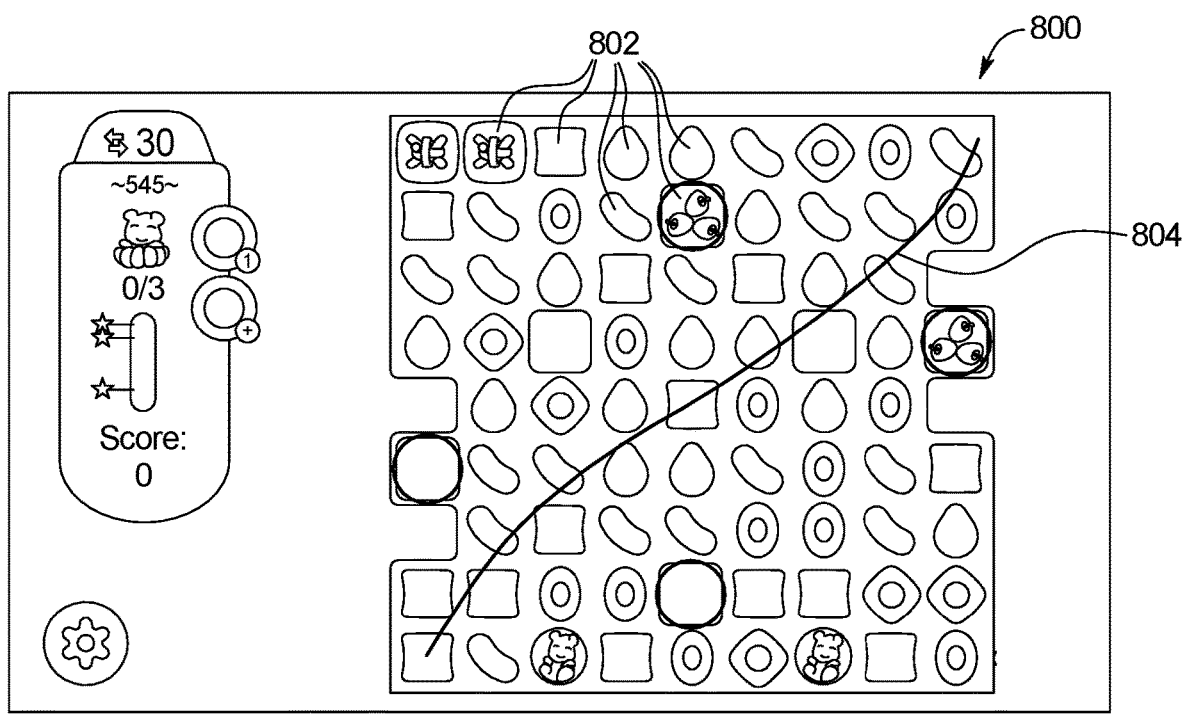
FIGS. 8A and 8B is an illustrative user interface and a graph illustrated results of a candy-themed game.
Figure 8B:
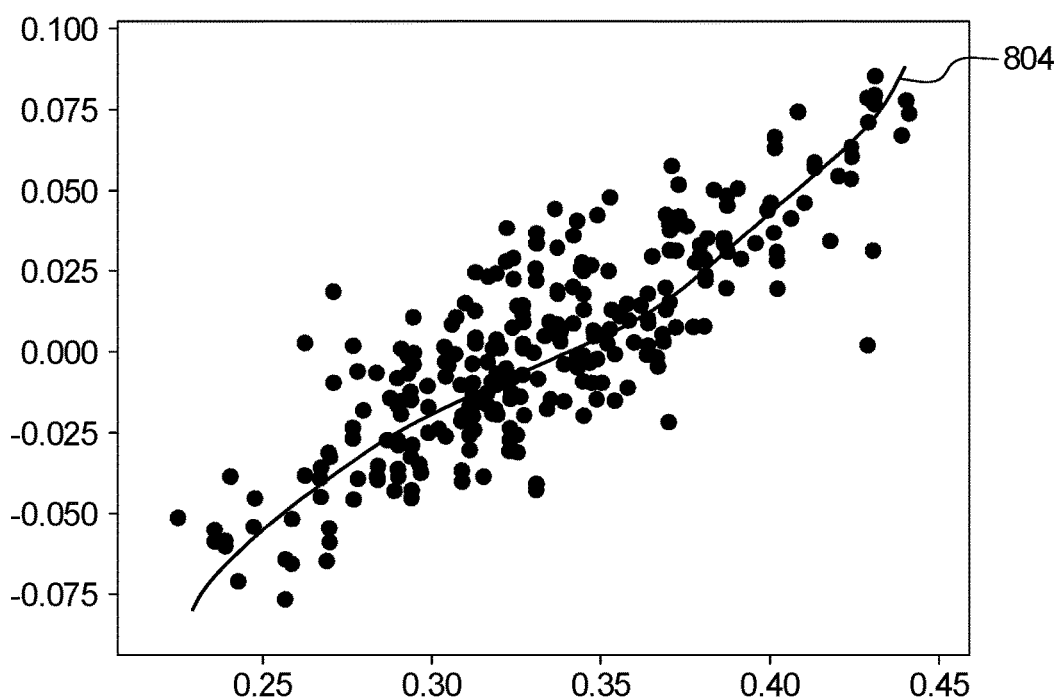

FIGS. 8A and 8B illustrate a candy-themed regression modelling game 800. As shown in FIG. 8A, a variety of candy 802 is presented to the user. The candy pieces 802 represent different types of data, with color, shape, or size variations corresponding to different point values. For example, a specific color may represent a higher point value because the corresponding data points has a high density at that point in the dataset. Candy in the upper left and lower right corners of FIG. 8A have low point values because the density at the corresponding regions of the dataset shown in FIG. 8B is very low. The user draws a single line, collecting the candy pieces 802 that are touched in the process. Similar to the Truffle Shuffle, backtracking is not allowed in the preferred embodiment. The user draws a line 804 through the candy 802, with the candy piece values being dependent on data point density as shown in FIG. 8B. The starting orientation of the candies 802 are placed in the form of the underlying training data, and additional points are awarded to the user depending on how well they fit the unseen test data. The user maximizes their score by choosing the best fit for the underlying data. After the user passes the first candy selection, the game progresses normally until the next level, when a new dataset/image is sent to the user.

Figure 9A:
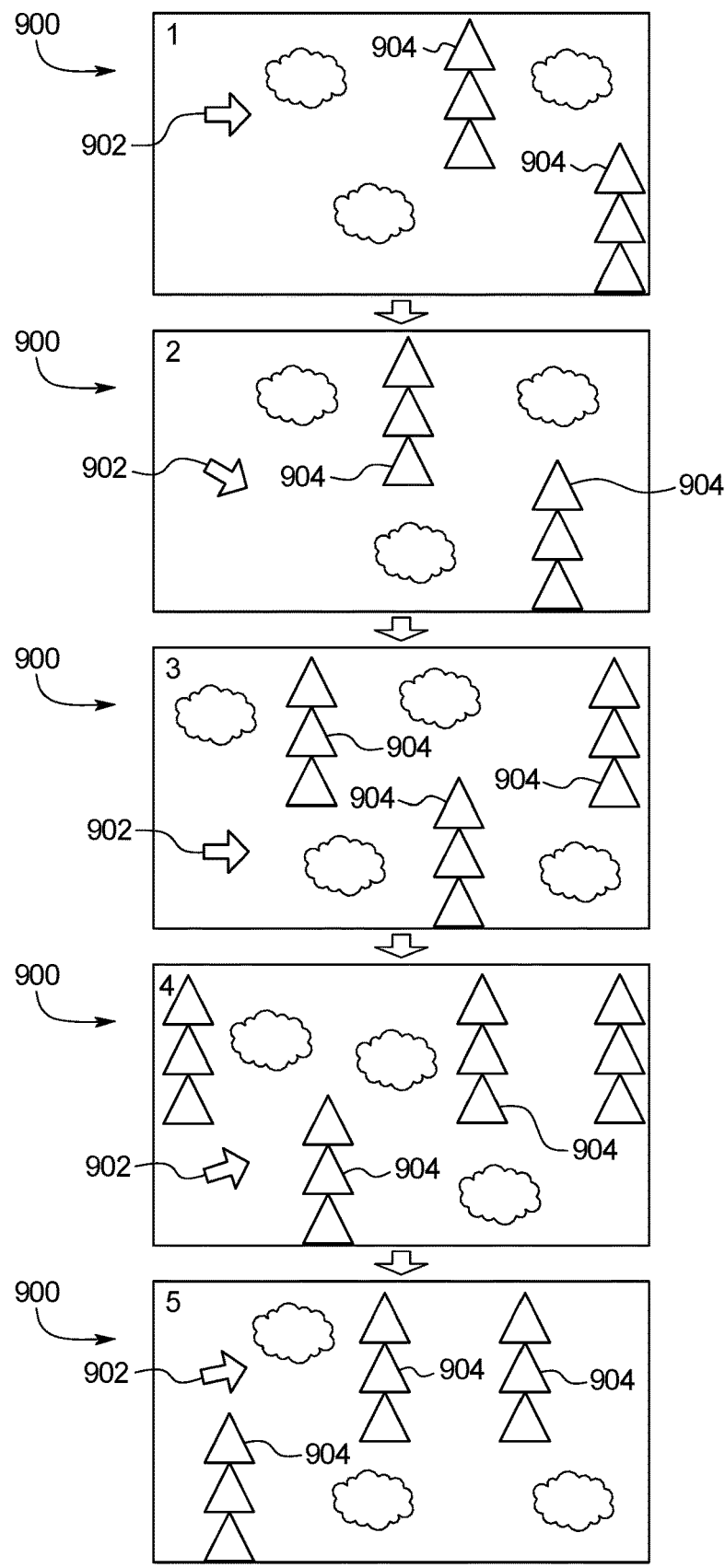
FIGS. 9A-9C are user interfaces of the game Airplane Madness.
Figure 9B:
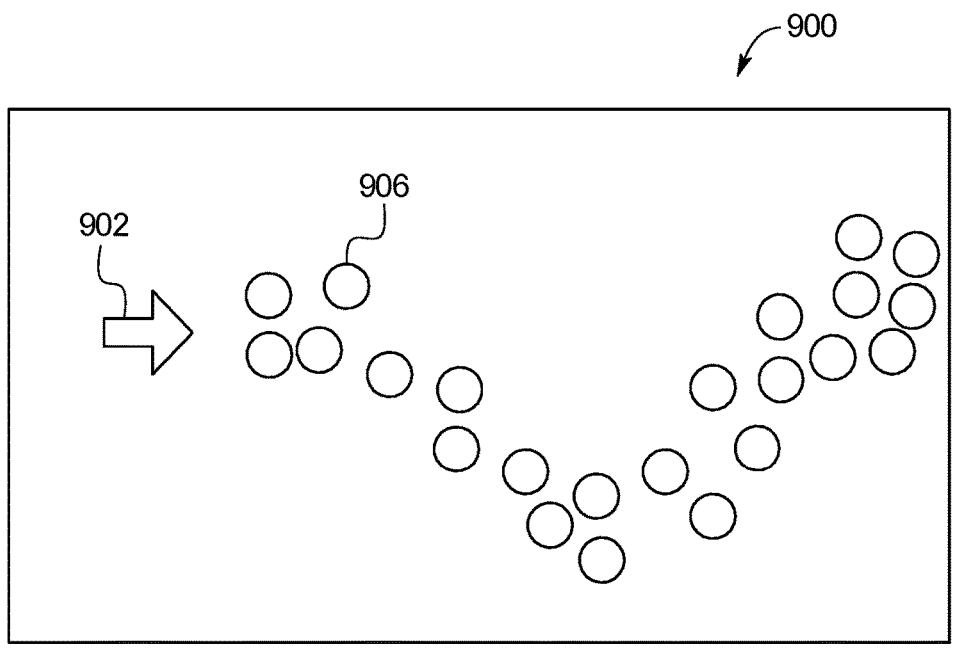
Figure 9C:
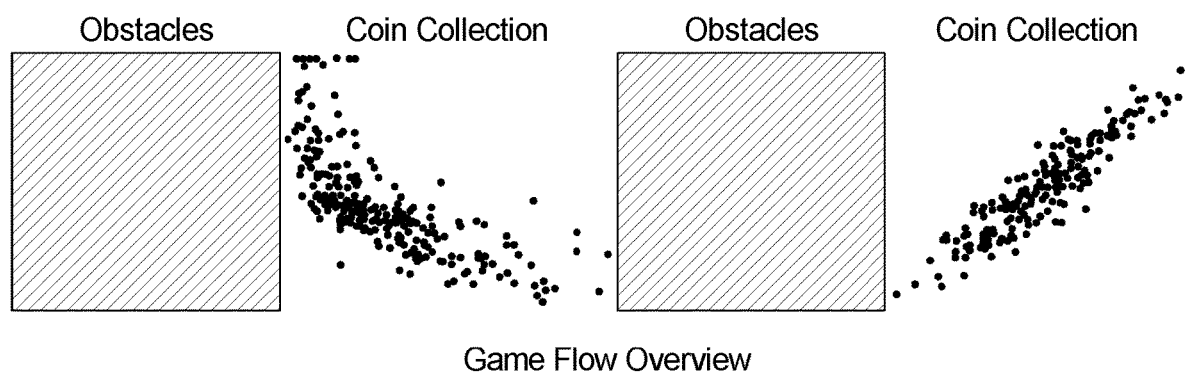

FIGS. 9A-9C illustrate a game 900 utilizing a plane traveling from left to right across the screen. In another embodiment, the plane 902 travels from the top to the bottom of the screen. Referring to the sequence of images shown in FIG. 9A, a series of obstacles blocks 904 are presented to the user that need to be avoided. The obstacles 904 may be unrelated to the underlying model training data.

Separating these obstacle blocks 904 are coin collecting areas 906 shown in FIG. 9B. The coins are generated and arranged as the arrangement of the training dataset. There are no obstacles 904 in the coin collection areas 906 to avoid influencing the fit. When the plane scrolls through the path of coins, that path is tracked and used as the user fit line. This fit line is then passed to the user fit storage module 106. For gameplay and model building efficiency, the obstacles 904 and coin collecting areas 906 are pre-generated and stored as game images. FIG. 9C illustrates example data sets corresponding to the obstacles 904 and coin collecting areas 906. In the illustrated embodiment, the coin collecting areas 906 correspond to the dataset and the obstacles 904 are included to make the game more interactive.

Figure 10A:
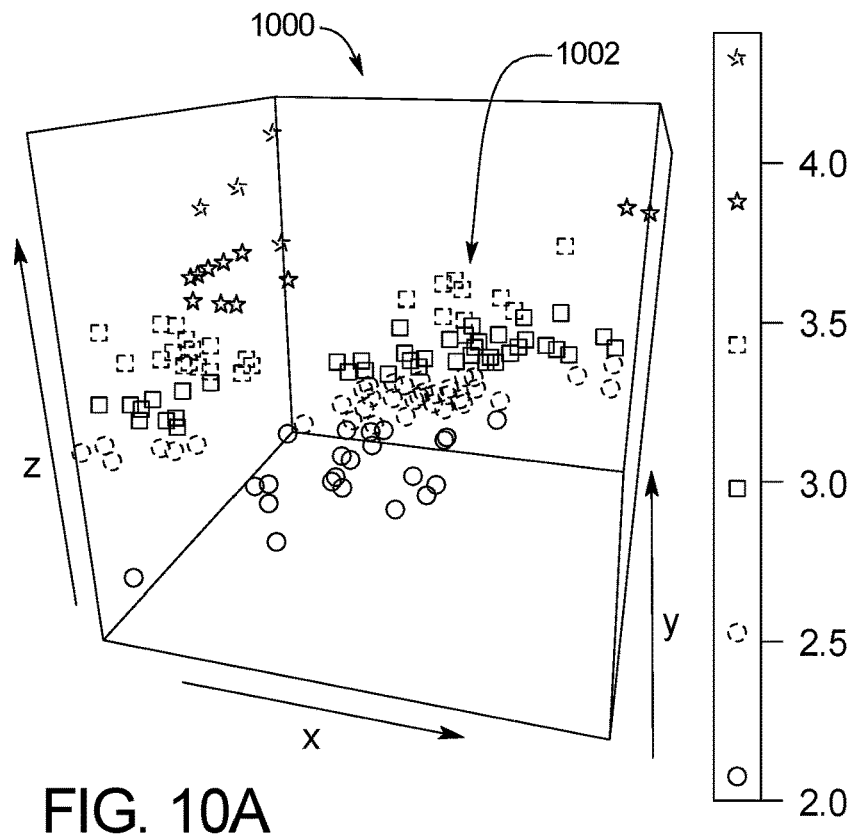
FIGS. 10A and 10B are images from the game Minimizer.
Figure 10B:
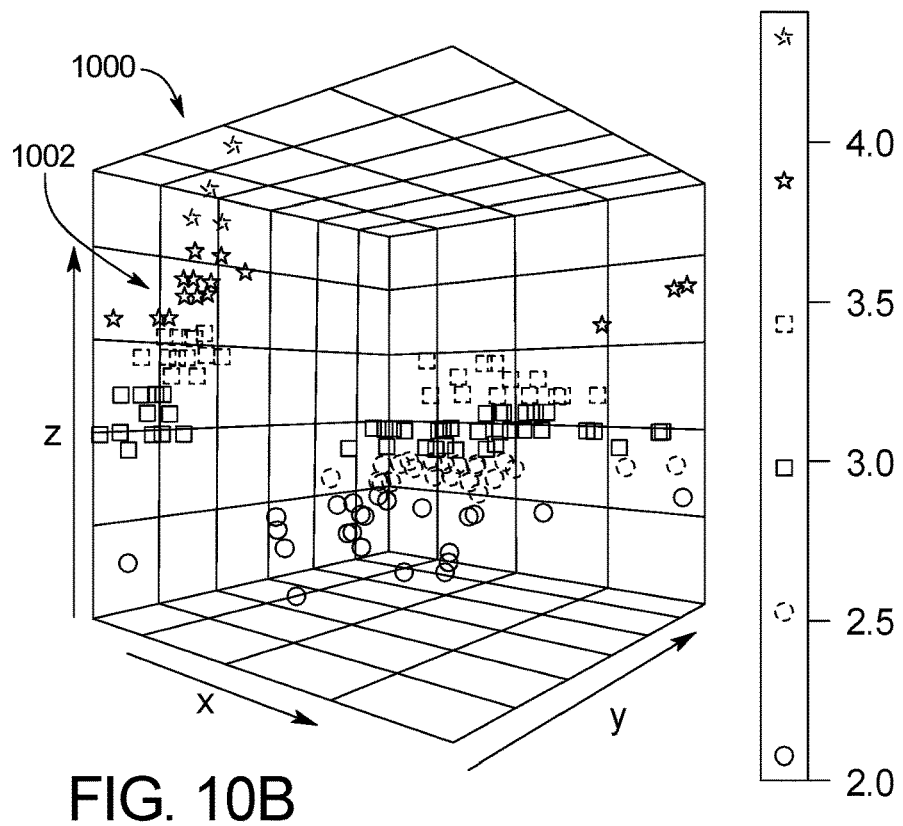

FIGS. 10A and 10B illustrate a game 1000 that requires the user to determine an orientation of a three-dimensional (3D) plot of data. The user rotates, flips, and otherwise manipulates the orientation of the 3D plot 1002 to minimize or maximize the number of points on the screen. This rotational fit may be used to fit the data in a segmented manner, much like a spline. When the user finalizes the first orientation with the most data points for the size area, those points are removed and the user is then able to further segment the data. This game creates a piecewise linear fit of the data based on two underlying dependent variables. Each pair of variables are analyzed independently as the game progresses.

2.2 Classification Modeling Games

FIGS. 11A-11F illustrate a game 1100 featuring zombies and people, referred to as Zombie Attack. The user is shown an image where there are zombies (infected) 1102 and uninfected people 1104. The user builds one or more walls 1106 to separate the infected and uninfected groups and protect the uninfected people 1104 from the zombies 1102. If a zombie is too near to a human, the zombie may attack the uninfected person. The uninfected people may resist the zombies. In one embodiment, the number of uninfected 1104 left at the end of each timed round will be tallied to determine who wins. In another embodiment, the number of uninfected 1104 remaining at the end of each timed round will enable the user to progress to the next level.

Figure 11A:
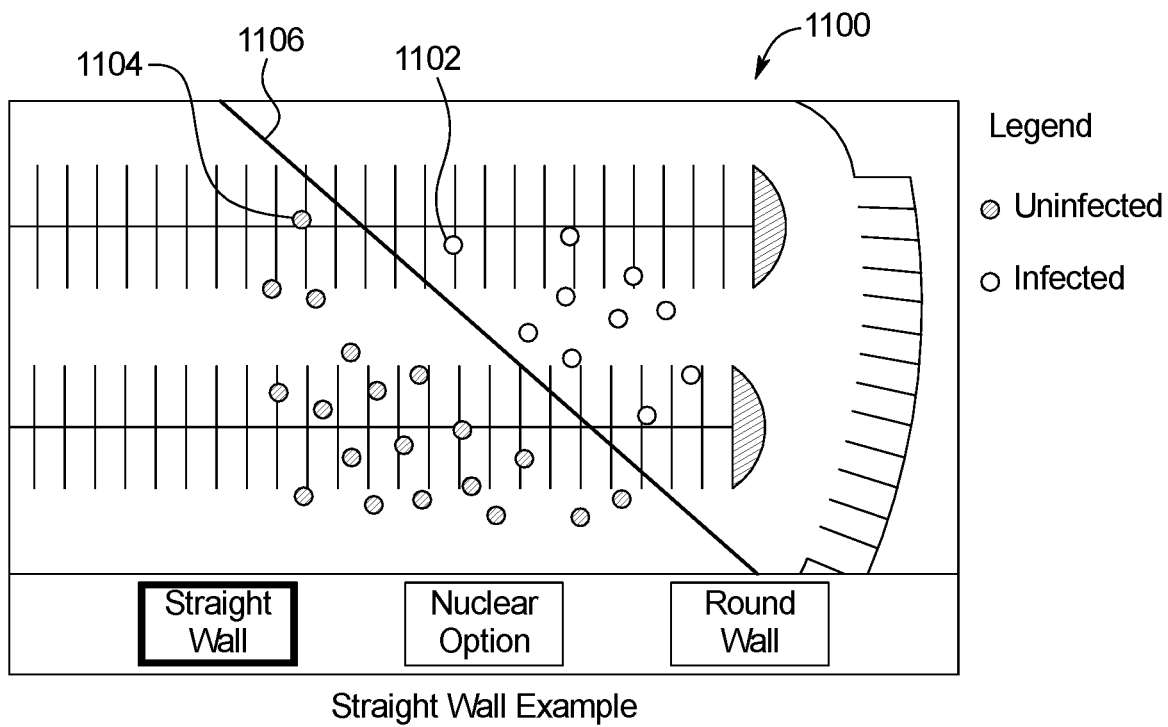
FIGS. 11A-11E are user interfaces and a graph illustrating the results of the game Zombie Attack.
Figure 11B:
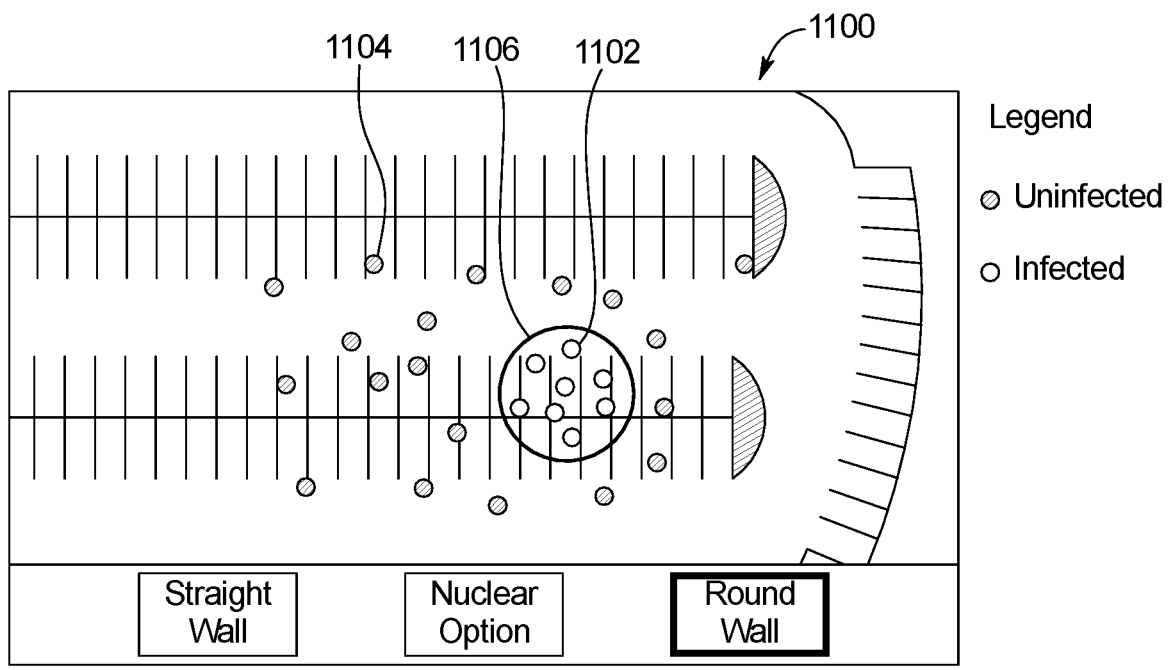
Figure 11C:
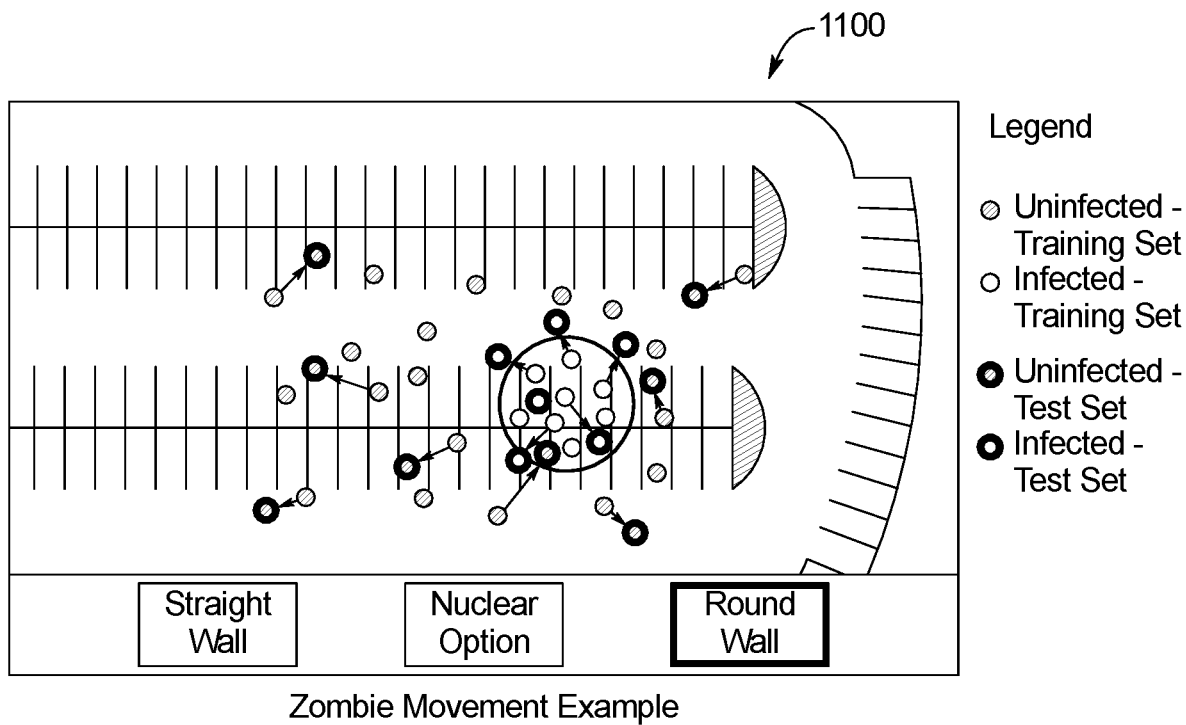
Figure 11D:
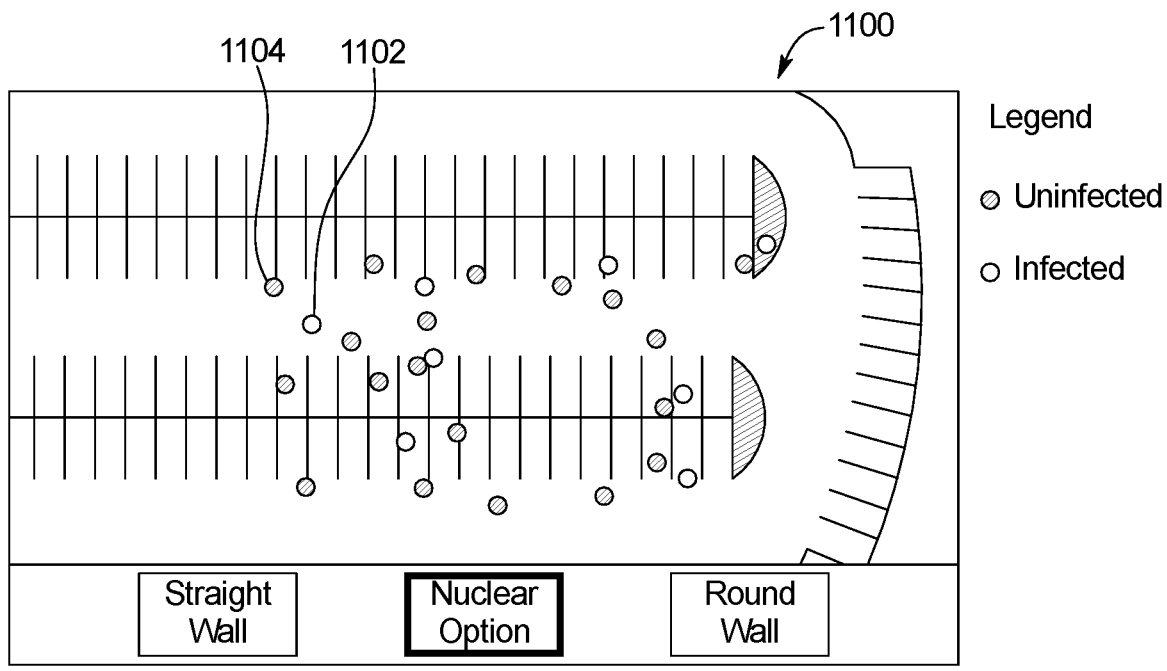

FIG. 11A shows a general game view of the game 1100. In the illustrated embodiment, the user may construct a straight wall 1106 shown in FIG. 11A or a round wall 1106 shown in FIG. 11B. During the game, the user selects which wall 1106 is best to minimize the number of zombie attacks on the uninfected people. Once the wall 1106 is selected, the uninfected 1104 and the zombies 1102 are move in and out of the walled area until the wall is constructed. Some humans 1104 will mistakenly run behind the wall and get trapped, and, likewise, some zombies 1102 will run past the wall before it is built and will have a chance to attack the humans 1104 on the other side. FIG. 11C illustrates such movement. If it is not possible to separate the zombies 1102 from the uninfected 1104, the user is given a nuclear option shown in FIG. 11D. This will allow the user to avoid maps where there is a no signal.

Figure 11E:
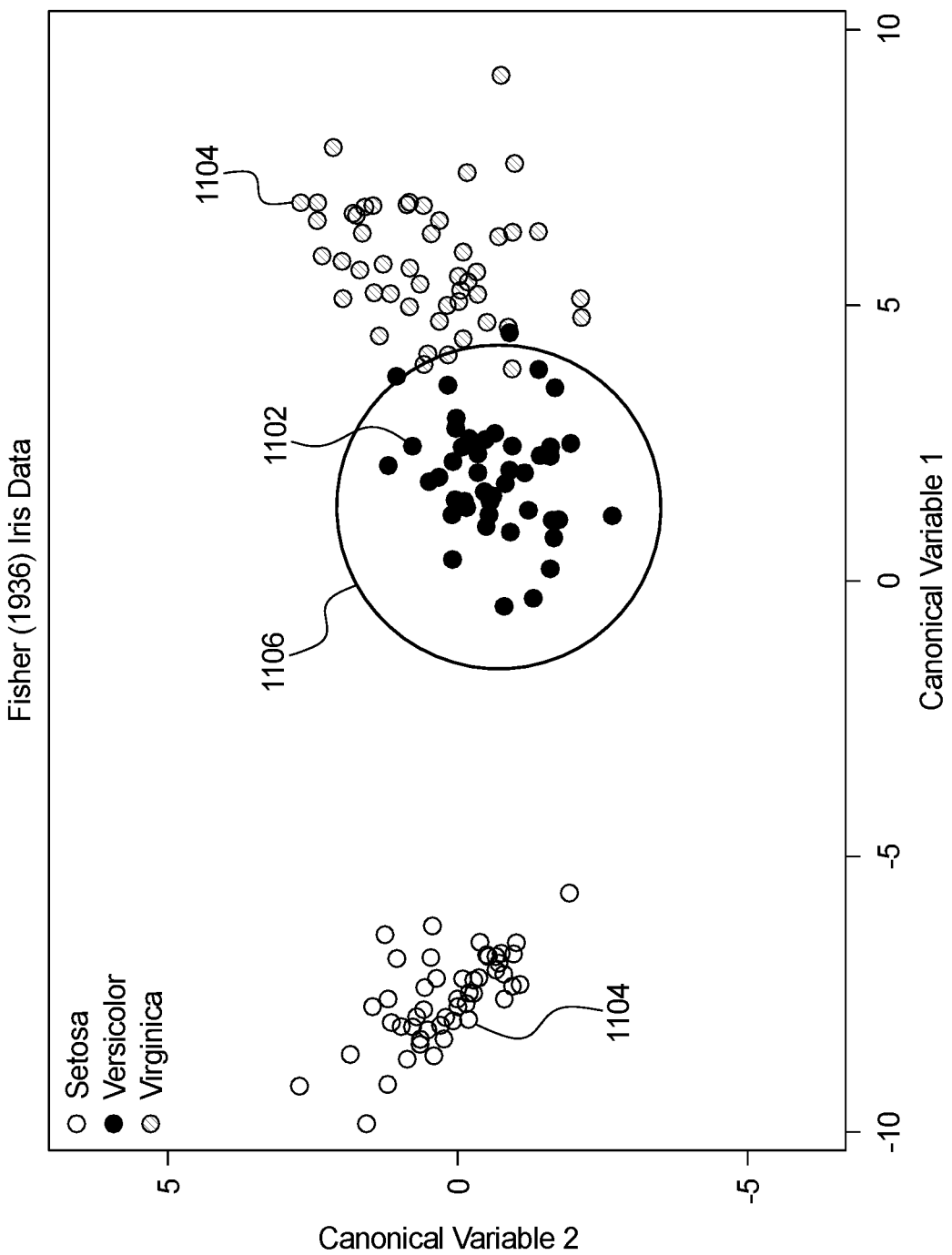

The test dataset is used to determine the movement path of both the uninfected and the zombies. This will provide a means for the user to avoid overfitting. FIG. 11E is an example of a simple classification of the IRIS dataset, mapped to Zombie Attack.

Figure 12A:
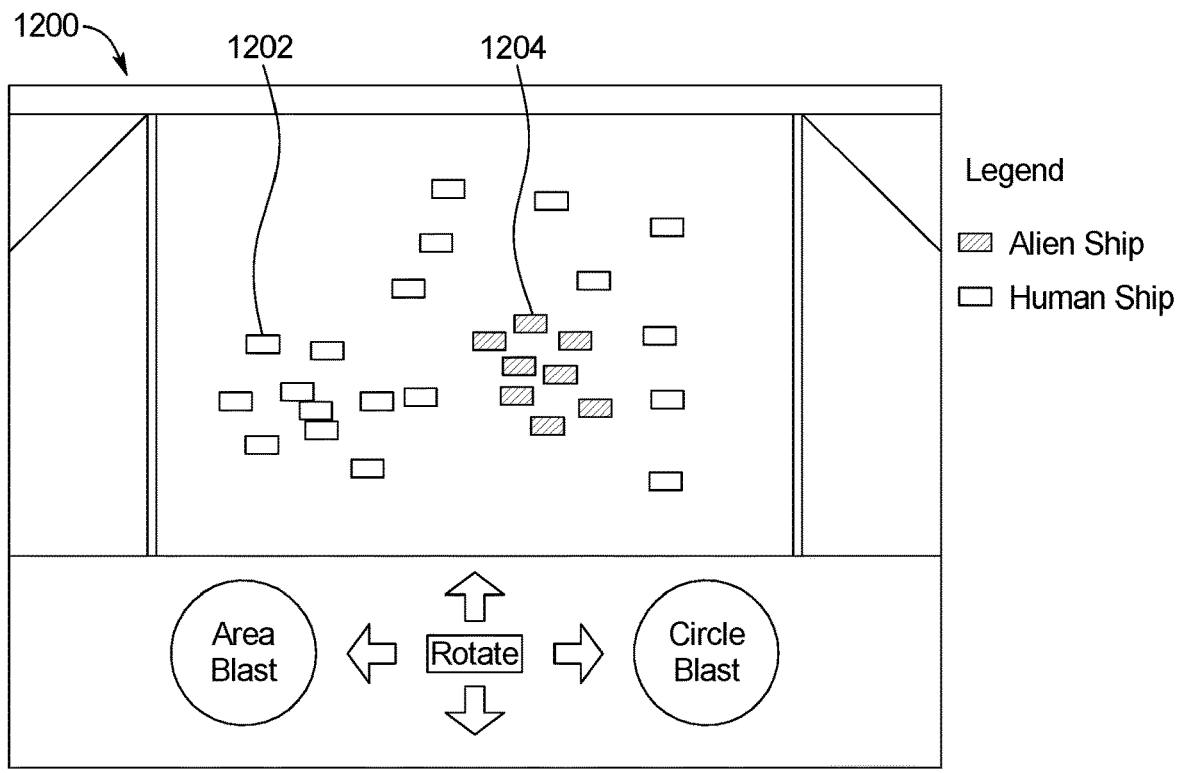
FIGS. 12A-12D are user interfaces of the game Space Invaders.
Figure 12B:
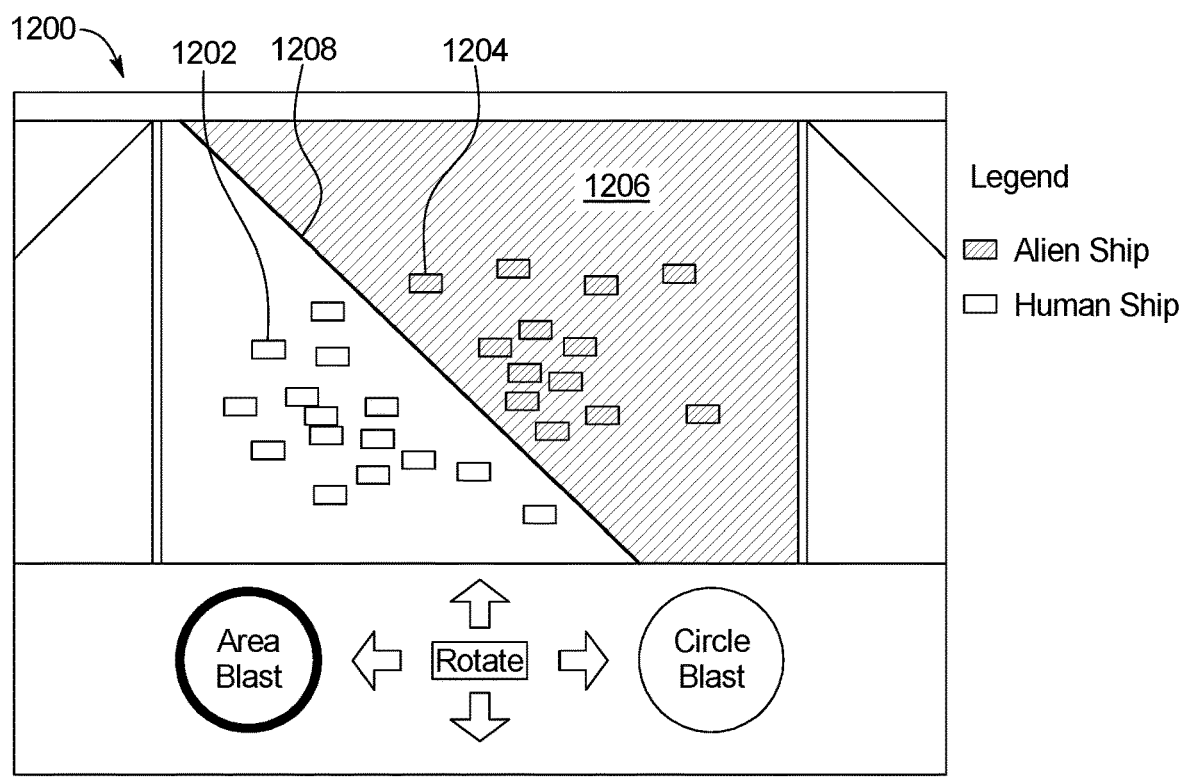
Figure 12C:
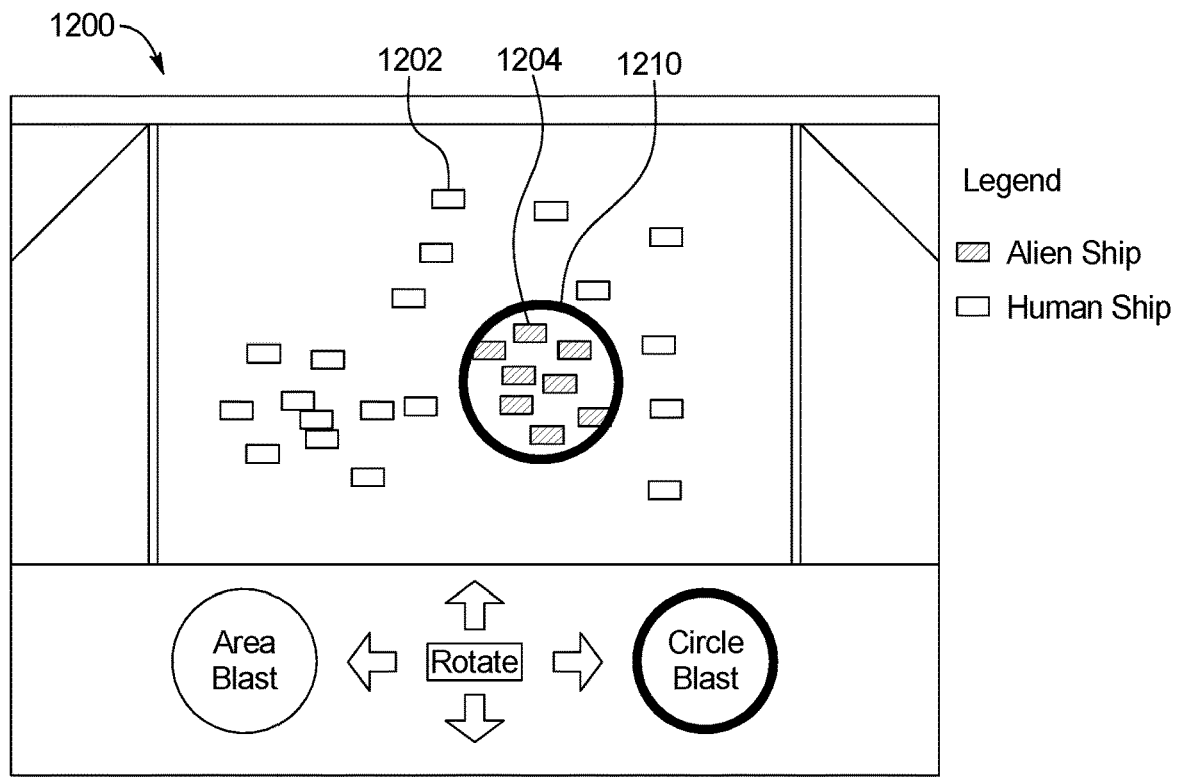
Figure 12D:
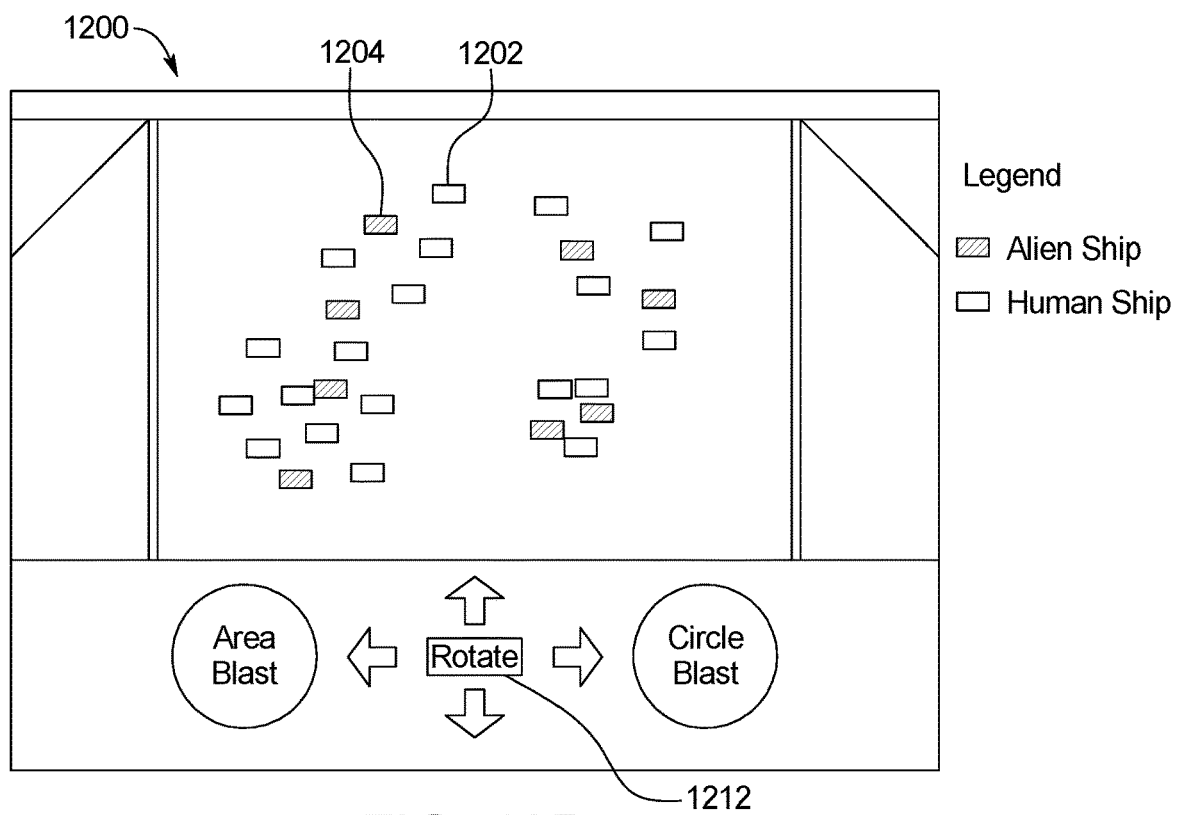

FIGS. 12A-12D illustrates a further game 1200 called Space Invaders. In this game, the user controls a space ship in the center of a space battle. In the game image shown in FIG. 12A, the user views human and alien ships 1202, 1204 battling. The user's goal is to shoot as many alien ships 1204 without harming the human ships 1202. The gun can shoot area blasts 1206 as shown in FIG. 12B or circular blasts 1208 as shown in FIG. 12C. The circular blasts 1210 are the same as the circular walls in Zombie Attack, and the area blasts 1206 allow the user to draw a line 1208 through the screen and choose which area or side of the line will be decimated by the area blast.

If the user does not have a clear shot where they can shoot a number of alien space ships 1204 without harming an equal number of human ships 1202, the user can select the rotate controls 1212 and view a new ship distribution. By allowing the user to rotate, the socially-driven system 100 assumes that the variables shown to the user in the abandoned screen are not predictive of the dependent variable. The rotate option speeds up the time needed to develop a user fit and streamline gameplay. The rotate theory to switch screens may be incorporated into each of the games mentioned above.

2.3 Clustering Modeling Games

Figure 13A:
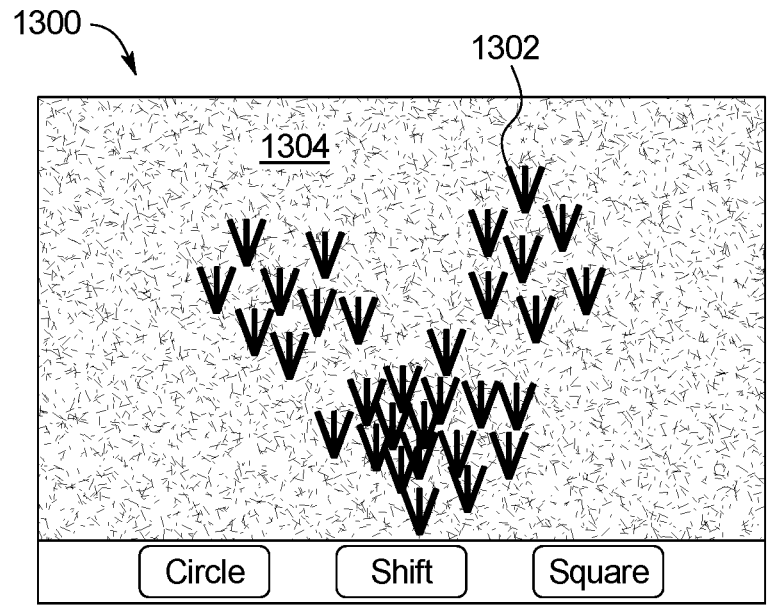
FIGS. 13A-13E are user interfaces of the game Pest Control.
Figure 13B:
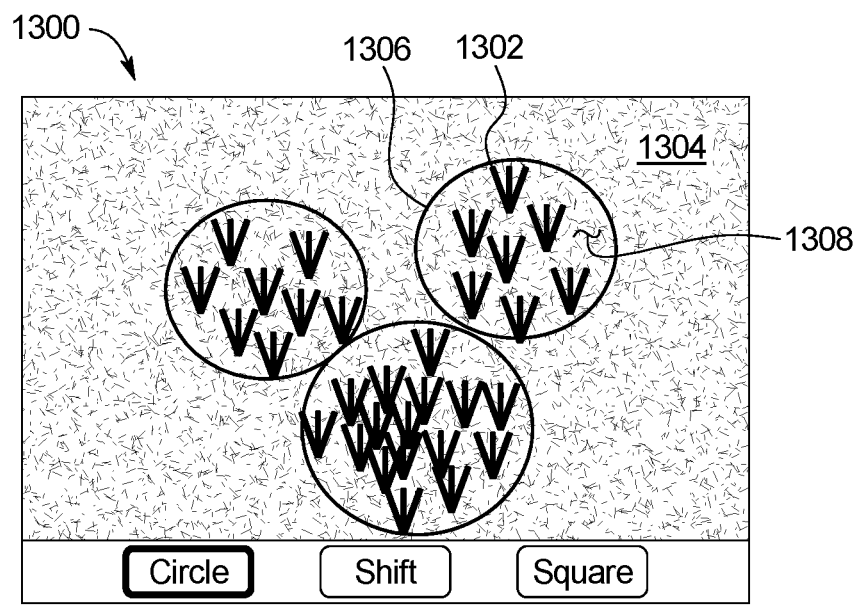
Figure 13C:
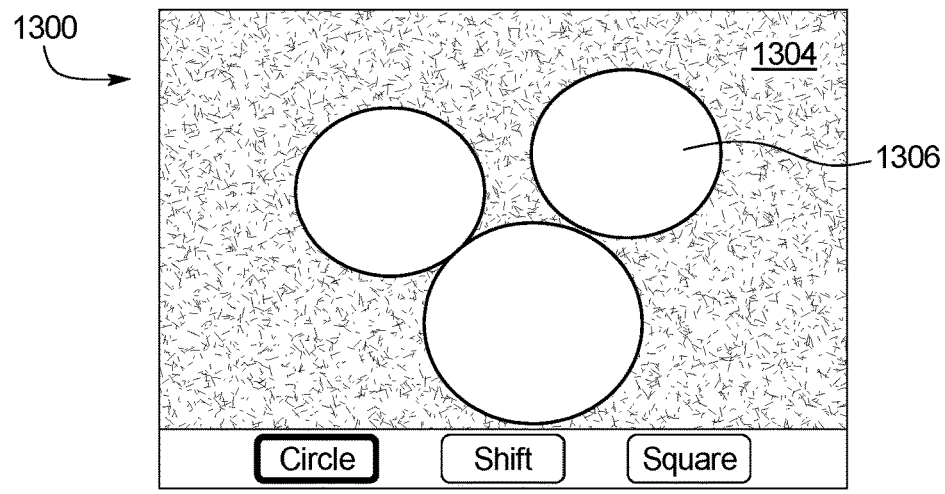

FIGS. 13A-13E illustrate a game 1300 referred to as Pest Control. The game image includes a number of weeds 1302 on a lawn 1304. The user selects an area 1306 for the weeds to be removed as shown in FIG. 13B, although both of the weeds 1302 and the grass 1308 are removed in the selected area 1306. The user must minimize the amount of grass 1308 removed that they pull while still pulling all of the weeds 1302.

Figure 13D:
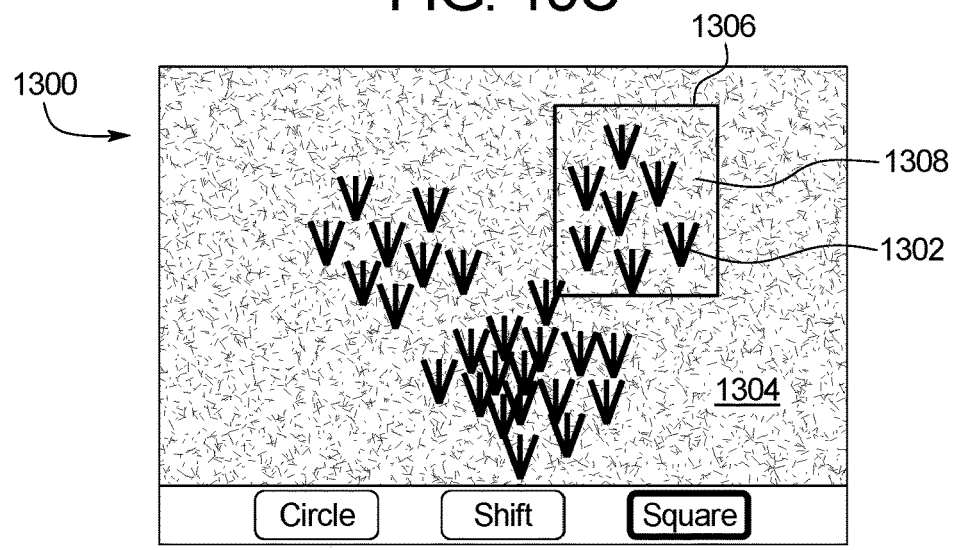
Figure 13E:
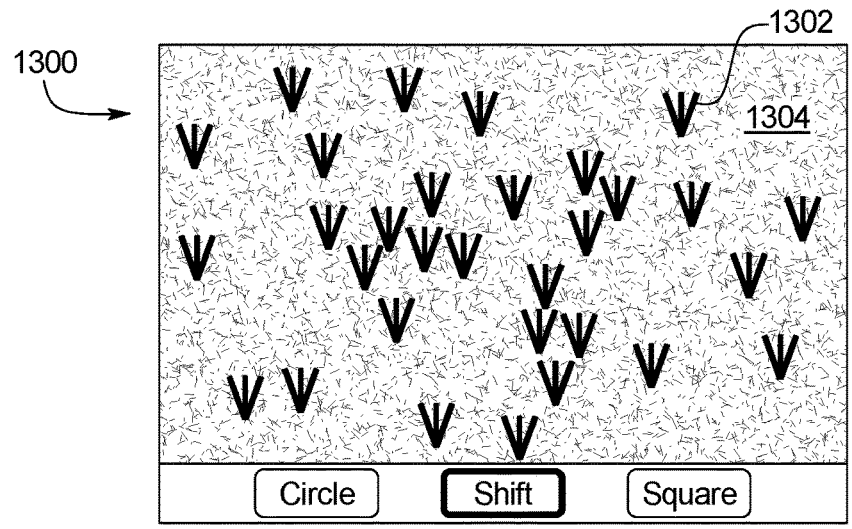

In the game 1300, the user may remove selected areas having a circle or a square shape (see FIG. 13D). Alternatively, the user may select the shift button to move the user's view to another portion of the lawn 1304 having a new distribution of weeds 1302, as shown in FIG. 13E. The shift button of Pest Control operates similar to the rotate button of Space Invaders, described above.

2.4 Human-Aided Machine Learning Games

Figure 14A:
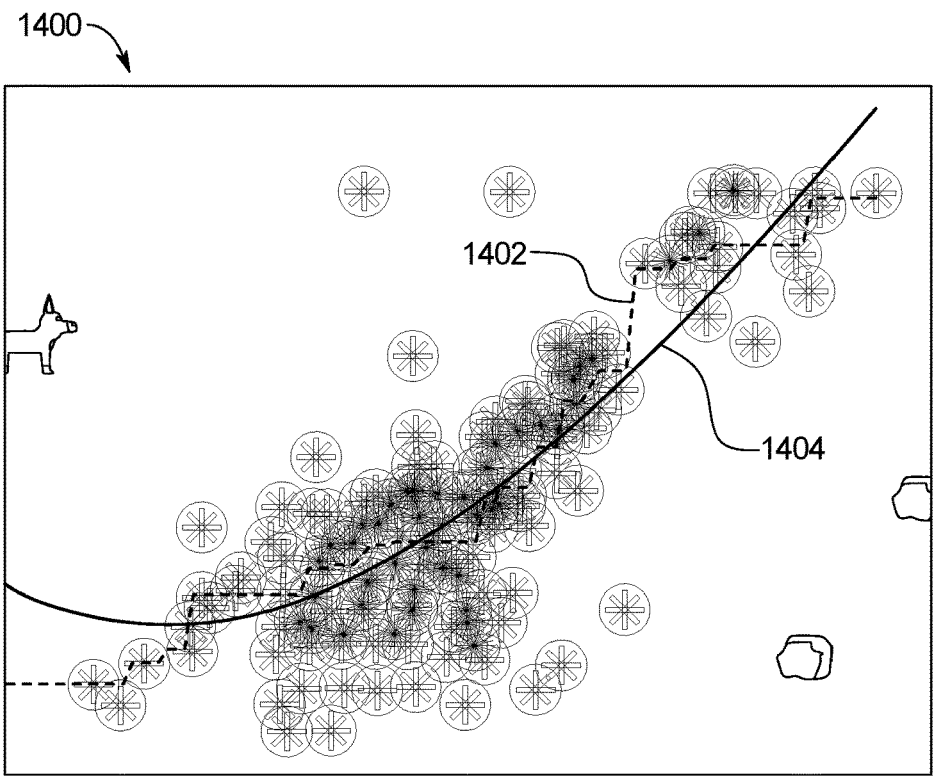
FIGS. 14A and 14B are user interfaces of human-aided machine learning games.
Figure 14B:
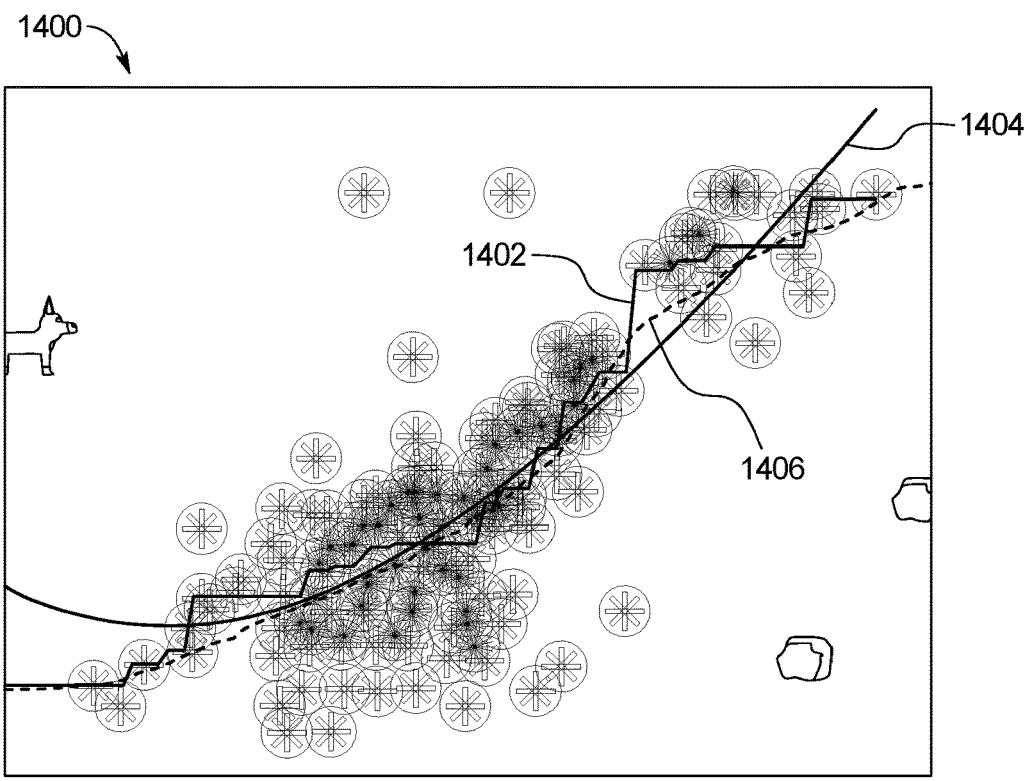

FIGS. 14A-14E illustrate a game 1400 that utilizes a human-aided machine learning approach. In an initial image shown in FIG. 14A, preliminary models are fit to data of trees and truffles, and are shown to the user. The dataset has been fit by a polynomial 1402 and a GBM model 1404. The user then draws their user fit 1406 leveraging the pre-drawn machine-learning fits, as shown in FIG. 14B.

When the user draws the user fit, they can choose the best aspects of the fit lines shown to produce a final fit line. As seen in FIG. 14B, the user fit 1406 exemplifies a model that find a minimum in the bias variance tradeoff by leveraging the innate ability of humans to find patterns in data.

Figure 15A:
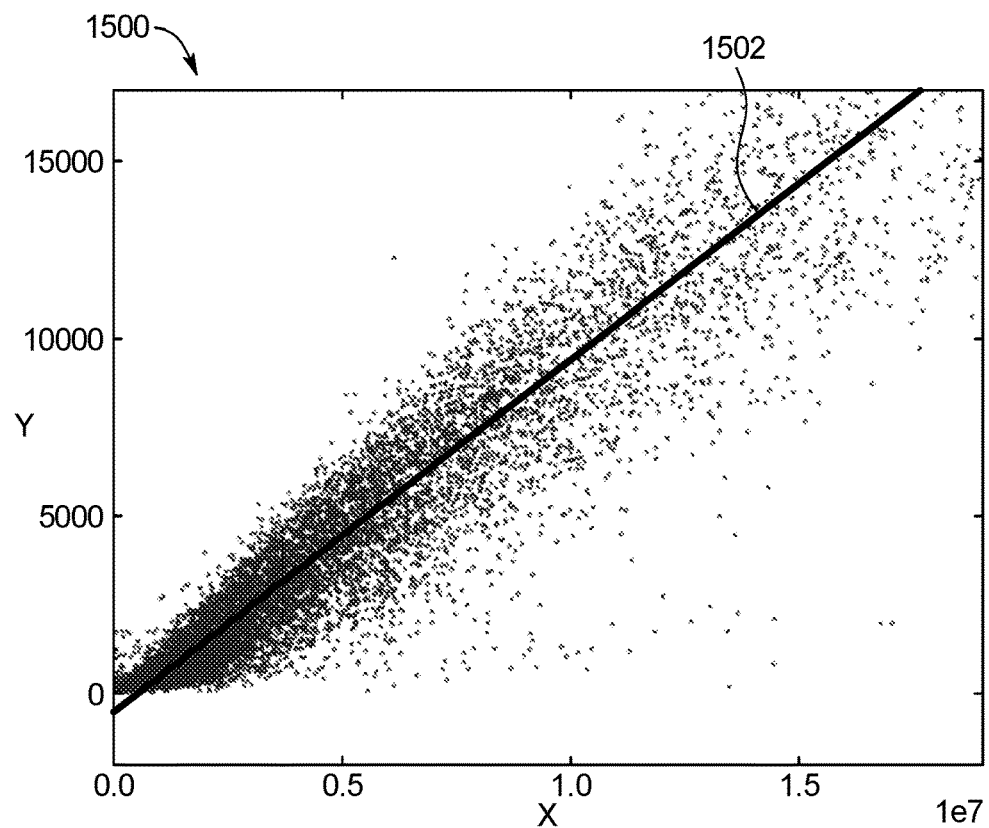
FIGS. 15A and 15B are datasets including a computer generated fit and a combined user-machine generated fit, respectively, for human-aided machine learning games.
Figure 15B:
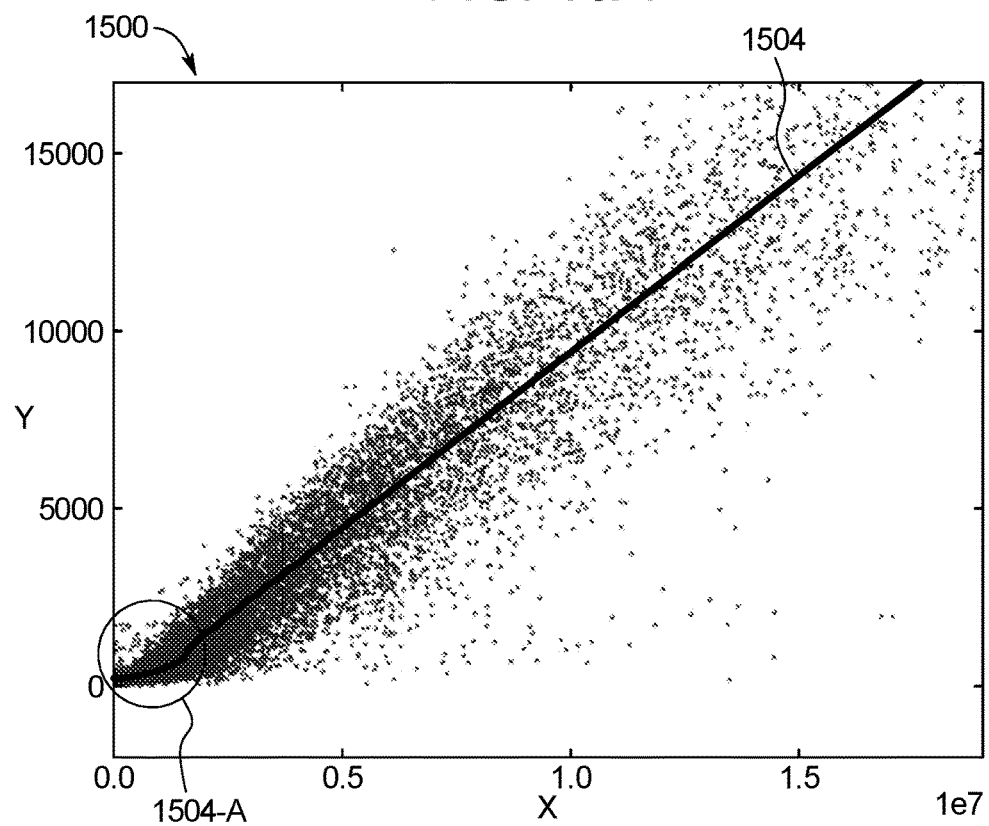

In another embodiment or aspect, the user may modify pre-drawn model fits by erasing portions of the pre-drawn fit lines and incorporating the user's own contribution. For example, the fit line 1502 of FIG. 15A is a simple linear regression, while the fit line 1504 of FIG. 15B has been modified by the user. The fit line 1504-A for small values of X has been smoothed out to better represent the true signal of the data.

Figure 16:
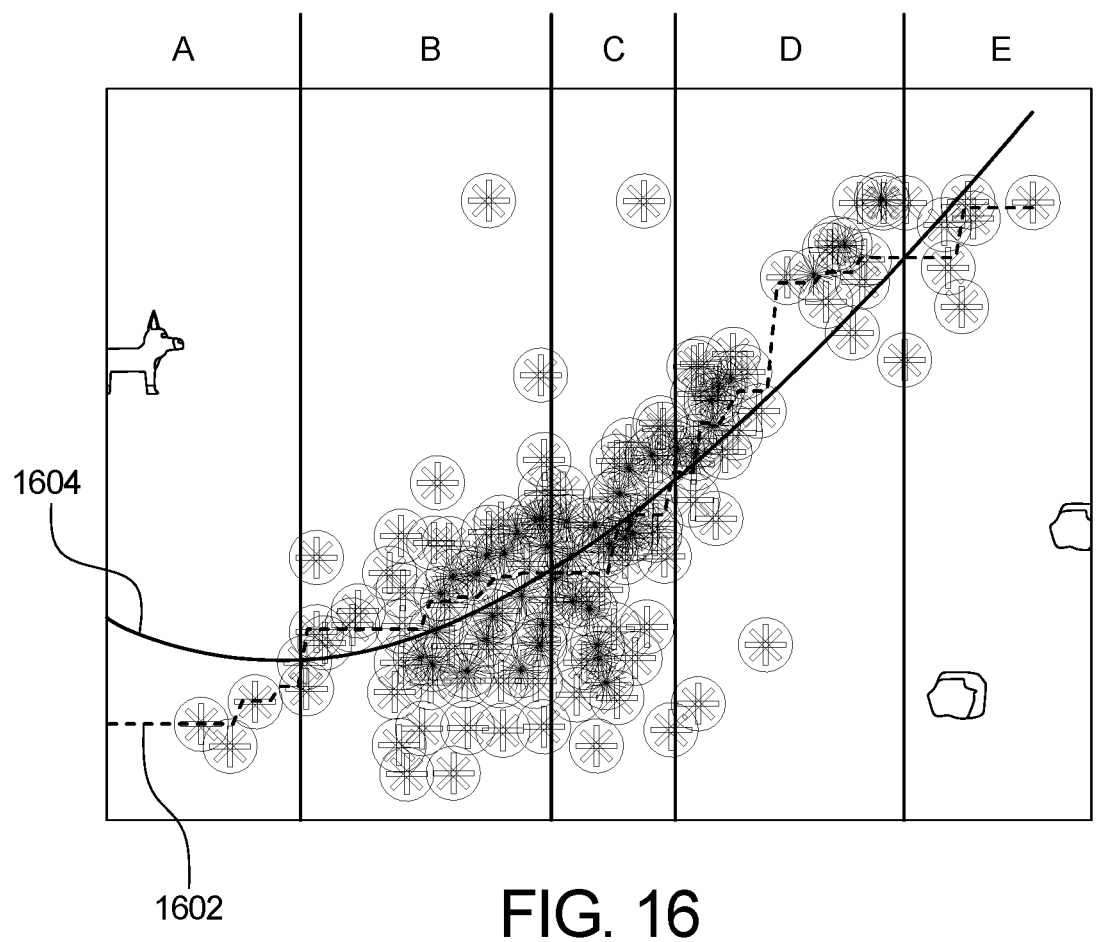
FIG. 16 is a user interface of a human-aided machine learning game showing a user fit based on combination of computer-generated fits.

A third application of human-aided machine learning modeling includes bucketing model fits by quality as shown in FIG. 16. In this embodiment, the user may choose the best fit model for short intervals of a given variable. The dataset of FIG. 16 has been fit by a polynomial 1602 and a GBM model 1604. The user selects a model fit for ranges of X-values in each data plot, piecing together a user fit including portions of the pre-drawn machine-learning fits. The user fit comprises the polynomial fit 1602 for x-values along sections A, C, and E and the GBM model fit 1604 for x-values in sections B and D.

While the above examples are shown for regression models, the human-aided machine learning modeling may be applied to classification and clustering models as well.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A socially-driven system comprising:
   a database including a dataset;
   a processor;
   a display controlled by the processor; and
   a memory coupled to the processor, wherein the memory is configured to store program instructions executable by the processor;
   wherein in response to executing the program instructions, the processor is configured to:
      receive a dataset;
      generate a game image that represents the data set;
      display the game image on a user device; and
      receive user input within the game image from the user device, wherein the user input has a value derived from the dataset, and wherein the user input comprises a user fit of the dataset.

2. The socially-driven system of claim 1, wherein the processor is configured to:
   display the game image on a plurality of user devices;
   receive a plurality of user inputs within the game image from the plurality of user devices, respectively, wherein each user input has a value derived from the dataset, and wherein each user input comprises a user fit of the dataset; and
   determine an average fit for the dataset based on the user input.

3. The socially-driven system of claim 2, wherein the dataset comprises one of test datasets and train datasets.

4. The socially-driven system of claim 2, wherein the processor is configured to generate data packets specific to a variable to be modeled.

5. The socially-driven system of claim 2, wherein the processor is configured to generate data packets specific to a variable to be modeled.

6. The socially-driven system of claim 1, wherein the value of the user input increases as the user fit better fits the dataset.

7. The socially-driven system of claim 1, wherein the game image includes at least one preliminary fit model.

8. The socially-driven system of claim 7, wherein the user input comprises a portion of the at least one preliminary fit model.

9. The socially-driven system of claim 7, wherein the game image includes a plurality of preliminary fit models, and the user input comprises one or more portions of the plurality of preliminary fit models.

10. The socially-driven system of claim 1, wherein the game image includes a plurality of focus objects and a plurality of obstacles, wherein each focus object is an object to be collected or destroyed, and wherein the plurality of focus objects and the plurality of obstacles guide the user input.

11. The socially-driven system of claim 1, wherein the game image includes a three-dimensional plot of points that can be manipulated.

12. The socially-driven system of claim 11, wherein the game image includes a button, and wherein the user input further includes manipulation of the plot of points and selection of the button.

13. The socially-driven system of claim 12, wherein activation of the button removes a subset of the plot of points, and wherein the value of the user input corresponds to removed subset of the plot of points.

14. A method for determining a user fit comprising the steps of:
   receiving a dataset;
   generating a data packet based on a variable from the dataset;
   generating a game image based on the data packet;
   displaying the game image on a plurality of user devices;
   receiving a plurality of user input via the game image from the plurality of user devices, wherein each user input has a value derived from the dataset, and wherein each user input comprises a user fit of the dataset;
   analyzing the plurality of user input to generate a best fit of the dataset.

15. The method of claim 14, wherein the game image includes a plurality of focus objects and a plurality of obstacles, wherein each focus object is an object to be collected or destroyed, and wherein the plurality of focus objects and the plurality of obstacles guide the user input.

16. The method of claim 15, wherein the game image includes at least one preliminary fit model.

17. The method of claim 16, wherein the user input comprises a portion of the at least one preliminary fit model.

18. The method of claim 15, wherein the game image includes a plurality of preliminary fit models, and the user input comprises one or more portions of the plurality of preliminary fit models.

* * * * *